(12) United States Patent
Tutavac et al.

(10) Patent No.: US 12,480,811 B2
(45) Date of Patent: Nov. 25, 2025

(54) SYSTEM AND METHOD FOR ILLUMINATION SOURCE IDENTIFICATION

(71) Applicants: Jakov Tutavac, Opuzen (HR); Dubravko Babic, Milpitas, CA (US)

(72) Inventors: Jakov Tutavac, Opuzen (HR); Dubravko Babic, Milpitas, CA (US)

(*) Notice: Subject to any disclaimer, the term of this patent is extended or adjusted under 35 U.S.C. 154(b) by 197 days.

(21) Appl. No.: 18/335,269

(22) Filed: Jun. 15, 2023

(65) Prior Publication Data

US 2024/0219232 A1 Jul. 4, 2024

Related U.S. Application Data

(60) Provisional application No. 63/435,916, filed on Dec. 29, 2022.

(51) Int. Cl.
| | |
|---|---|
| *G01J 3/02* | (2006.01) |
| *B64G 1/66* | (2006.01) |
| *G01J 3/06* | (2006.01) |
| *G01J 3/12* | (2006.01) |
| *G01J 3/42* | (2006.01) |

(52) U.S. Cl.
CPC ............ *G01J 3/0294* (2013.01); *B64G 1/66* (2013.01); *G01J 3/0208* (2013.01); *G01J 3/0275* (2013.01); *G01J 3/06* (2013.01); *G01J 3/12* (2013.01); *G01J 3/42* (2013.01); *G01J 2003/066* (2013.01); *G01J 2003/1213* (2013.01)

(58) Field of Classification Search
CPC ...... G01J 3/0294; G01J 3/0208; G01J 3/0275; G01J 3/06; G01J 3/12; G01J 3/42; G01J 2003/066; G01J 2003/1213; B64G 1/66
See application file for complete search history.

(56) References Cited

U.S. PATENT DOCUMENTS

| | | | |
|---|---|---|---|
| 2012/0232836 A1* | 9/2012 | Ohmi | G06F 3/0304 702/150 |
| 2019/0104247 A1* | 4/2019 | Feng | H04N 23/72 |
| 2021/0334513 A1* | 10/2021 | Orth | G01N 21/6458 |
| 2021/0408825 A1* | 12/2021 | Tatsiankou | G01J 3/027 |
| 2023/0131042 A1* | 4/2023 | Lysov | H04N 23/745 250/252.1 |

* cited by examiner

*Primary Examiner* — Tarifur R Chowdhury
*Assistant Examiner* — Carlos Perez-Guzman
(74) *Attorney, Agent, or Firm* — Shalini Venkatesh

(57) ABSTRACT

A light detection module has N optical channels, each with an optical filter, a detector, and an amplifier; and an N×1 switch with N input ports each connected to one corresponding output port of each channel to receive an amplified detector output corresponding to a filtered optical intensity incident on that detector. The switch cycles between channels, connecting each amplified detector output in turn to the output port. An ADC samples a time dependent optical intensity signal from the switch, generating a corresponding ADC digital signal output. A microcontroller, connected to the N×1 switch and the ADC, controls acquisition by the ADC to provide a digital voltage data stream from each channel; making the average optical intensity value characterizing the voltage data stream available from each channel at a digital output port of the microcontroller, as N data values, characterizing the light incident on the N channels of the module.

5 Claims, 15 Drawing Sheets

Figure 1:
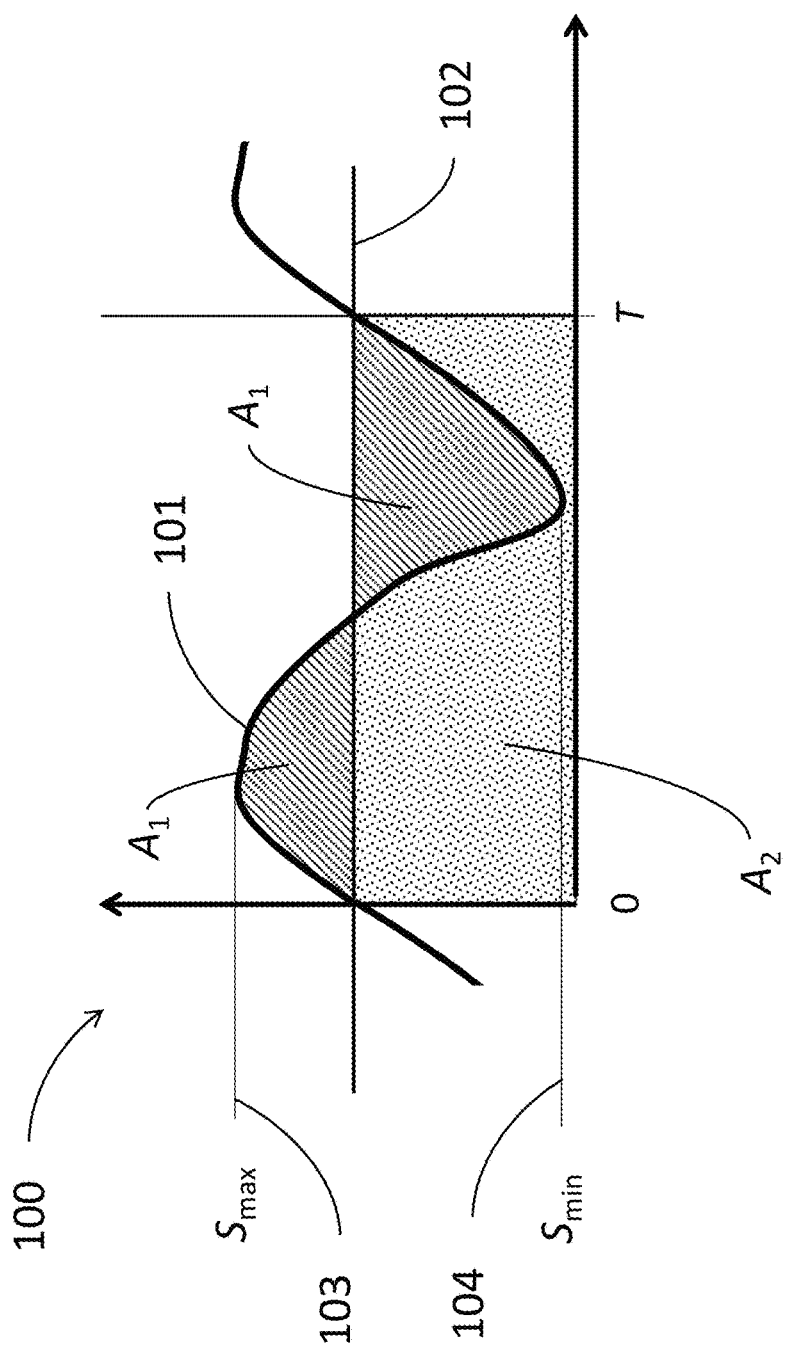

| | HPM | HPS | MH 3000 K | MH 4000 K | LED | MIN ERR |
|---|---|---|---|---|---|---|
| $\lambda_1$ | 365 | | 365 | 365 | | * |
| $\lambda_2$ | 405 | | 405 | 405 | | * |
| $\lambda_3$ | 436 | | | 436 | | |
| $\lambda_4$ | | | | | 450 | * |
| $\lambda_5$ | | | 461 | | | |
| $\lambda_6$ | | 467 | | | | |
| $\lambda_7$ | | | 475 | 475 | | |
| $\lambda_8$ | | 499 | 499 | | | |
| $\lambda_9$ | | | 509 | 509 | | * |
| $\lambda_{10}$ | | | 516 | | | |
| $\lambda_{11}$ | 546 | | 546 | | | |
| $\lambda_{12}$ | | | | 569 | | |
| $\lambda_{13}$ | 578 | | 578 | | | |
| $\lambda_{14}$ | | | 591 | 591 | | |
| $\lambda_{15}$ | | | 611 | | | |
| $\lambda_{16}$ | | | 617 | | | * |
| $\lambda_{17}$ | | | | | 654 | * |
| $\lambda_{18}$ | | | 671 | | | |
| $\lambda_{19}$ | | | 813 | | | |
| $\lambda_{20}$ | | 820 | 820 | 820 | | * |

FIG. 12

SYSTEM AND METHOD FOR ILLUMINATION SOURCE IDENTIFICATION

FIELD OF THE INVENTION

The present invention relates to optical signal analyzing apparatuses and methods, and more particularly to identification and characterization of light sources.

BACKGROUND

An increasing demand for higher luminous efficacy public illumination sources is in turn driving advancements in lighting infrastructure. Considerations of luminous efficacy and color quality have driven the change from conventional high-intensity discharge lamps to solid state lighting. However, different types of light sources emit light with distinct spectral features, varying by design and manufacturing technology choices and manufacturing tolerance. Present public illumination technologies span a wide range of light qualities and cost structures. A capability to remotely identify and categorize light sources over large areas, even at a global scale, would be of great value in both econometric and environmental studies.

Solid-State Lighting

Solid-state lighting or light-emitting-diode (LED) illumination is presently being installed for public illumination worldwide due to its higher energy efficiency and high color-rendering index relative to discharge lamps, the facts that it is non-toxic, that its components do not use mercury, as fluorescent bulbs do, and that the electronics used for its power supplies is generally compliant with occupational safety regulations worldwide.

The white LEDs used for public illumination and car lights generate white light in two steps, the first being the production of blue emission from blue GaN-based LEDs or lasers, and the second being the interception of that blue light by a phosphor that absorbs a fraction of the blue light and converts it to yellow light, which is then emitted along with the blue light, in a combination that is perceived as white. A phosphor, sometimes referred to as a luminophore, is a substance that exhibits luminescence, a property of substances which, when irradiated with light of one wavelength will emit light at one or more longer wavelengths. In other words, the light emitted from a phosphor has lower energy photons relative to the energy of photons of light incident on the phosphor. Combinations of various proportions of yellow light emitted by the yellow phosphor and blue light emitted by the blue LED or laser may be perceived by the human eye as being "white" with the term "white" covering colors with varying degrees of "warmth", a quality determined by the ratio of blue to yellow light intensities. Manufacturers express the degrees of "warmth" or the "coolness" of a lamp as a single number, the correlated color temperature (CCT), such that LEDs with a desired degree of "warmth" be easily identified.

The yellow emission spectrum of the yellow phosphors in current use is sufficiently broad to provide color rendering index (CRI) values that exceed those of practically all discharge lamps and only fall below those of halogen and incandescent lamps, which on the other hand carry significantly lower luminous efficacy. The technology of solid-state lighting is well known in the industry and can be found in numerous publicly available sources.[1]

[1] For example, the book "Introduction to solid-state lighting" by A. Žukauskas, M. S. Shur, and R. Caska, published by John Wiley and Sons in 2002.

Blue Light Emission

The advantages of solid-state lighting are unfortunately altered by the relatively strong presence of blue light, which is not present in natural night-time illumination and has not been historically present in night-time public illumination. In other words, strong blue light, visible to humans and animals, now occurs during periods when, evolutionally, there was no blue light, or at least none with the intensity generated by current white light-emitting diodes (LEDs). Numerous studies have been conducted with the goal of evaluating these effects on humans and animals, particularly due to its potential harm to circadian rhythms. Blue light emitted by light-emitting diodes may in fact be considered to be light pollution.

Flicker

Another phenomenon associated with public illumination, and now increasing in importance with the prevalence of solid-state lighting is flicker, which may be defined as quick, periodic changes in lamp intensity. The periodicity is primarily a result of the power line frequency or mains frequency, which can be either 50 Hz or 60 Hz, depending on global location. The fundamental frequency of the periodic light intensity modulation is given by the power modulation, which is 100 Hz or 120 Hz. Both these fundamental tones and their harmonics appear in the flicker. IEEE standard 1789™-2015 specifically deals with this issue. Flicker is a very important attribute of any type of illumination, but is significantly more important in indoor applications, such as classrooms, industrial areas, and offices, than in outdoor areas, such as roadways, parking lots, and exterior building illumination. Control of flicker requires more sophisticated and hence more expensive electronics. One is therefore more likely to observe high flicker lamps present in cost-sensitive applications, in which illumination flicker is tolerated as relatively less important.

In the industry, the metrics used to characterize flicker have been defined by standards IEEE1789-2015. Flicker metrics include flicker index (FI), flicker percent (FP), and flicker fundamental frequency. FIG. 1 shows an example of a periodic signal 100 with a waveform 101 of period T and an amplitude proportional to the light intensity. The fundamental frequency is the reciprocal value of the period T. The flicker fluctuation is described in terms of two areas: area $A_2$, which is the area below the average line 102 and below the signal line in one period, and area $A_1$ which is the area between the signal 101 and the average intensity line 102 in that period. Flicker index FI is defined as $FI:=A_1/(A_1+A_2)$. The flicker percent FP is defined with the maximum 103 and minimum 104 value of the signal 101 within a single period of the fundamental flicker frequency as: $FI:=(S_{max}-S_{min})/(S_{max}+S_{min})$. Products that characterize flicker are commercially available. For example, UPRTEK headquartered in Taiwan manufactures a spectral flicker meter that measures flicker index, flicker percent, and the spectral content of the light intensity fluctuation (product model MF250N).

Econometrics Related to Light Pollution

As the installation of solid-state lighting is a relatively recent phenomenon (relating to the last several decades) and its cost is not insignificant, the presence of solid-state lighting in a country or city can be used as an econometric indicator; it is related to the region's development and is a factor used to estimate wealth and regional economic phenomena such as inequality and poverty. Other applications include greenhouse gas emissions estimation based on night-time lights, quantifying and assessing impacts from major events, disasters and regional conflicts, tracking the behavior of nocturnally migrating birds attracted to lit urban areas, investigating light polluted areas for building astronomy observatories, among others. Quantifying the progress of solid-state lighting installations globally is hence desirable in providing indications of both economic and environmental progress.

Measurement of light pollution can be performed from the Earth's surface, by monitoring reflection from the sky, but it is significantly more useful when performed from low-Earth orbit (LEO) using Earth-observing satellites. Night-time satellite imaging of the surface of Earth, however, is presently performed only by a few satellites, and they image only the total light detected by either a monochromatic image sensor or by an RGB camera. Examples of such satellites include Suomi NPP (VIIRS), International Space Station, Luojia-1, and Jilin1-3B satellites.

The measured data made available to the public does not provide sufficient information to determine the type of light sources generating the light mixture detected, or more specifically to determine what fraction of the light detected comes from solid-state lighting and what fraction comes from discharge lamps, halogen lamps or incandescent lamps. Having this categorization data would provide scientists with valuable additional information on the economic development of different regions in the world and the intensity of light pollutions from sources.

Given the opportunity to observe and measure light emitted from the Earth surface during the night from a remote sensing platform, the questions of interest for environmental study and econometrics are: what are the different illumination sources that emit the light during the night; what is the contribution of each of the sources identified to the overall mixture as a function of global location; and, finally, what is the absolute radiance of the light captured and hence the absolute luminance or radiance of each of the contributing illumination sources.

Instruments that could answer these questions with measurements obtained from low-Earth orbit already exist, but unfortunately either they are not focused on this specific question, or the data is not publicly available. It is possible to acquire the full spectra of light sources and determine their radiance (or luminance) using spectrometers or spectrally resolved cameras. In a typical spectrometer, incident light is focused on a diffraction grating from which it is diffracted to be detected on a sensor, often a linear CCD array. Each pixel of the CCD array is assigned a wavelength and the relationship between the pixel ordinal number and the wavelength of light reaching that pixel depends on the type of grating and the geometrical attributes of the spectrometer design. The color differences in light emitted by light sources on Earth can be qualitatively detected from space using a multispectral camera, hyperspectral camera, or a spectrometer. Multispectral and hyperspectral imaging cameras generate large amounts of data that have to be transmitted to Earth, much of which may be superfluous for the relatively simple task of identifying light sources. Besides, hyperspectral imaging equipment is expensive and intended as payload on microsatellites rather than nanosatellites monitors for terrestrial applications that require light-pollution analysis.

Figure 2:
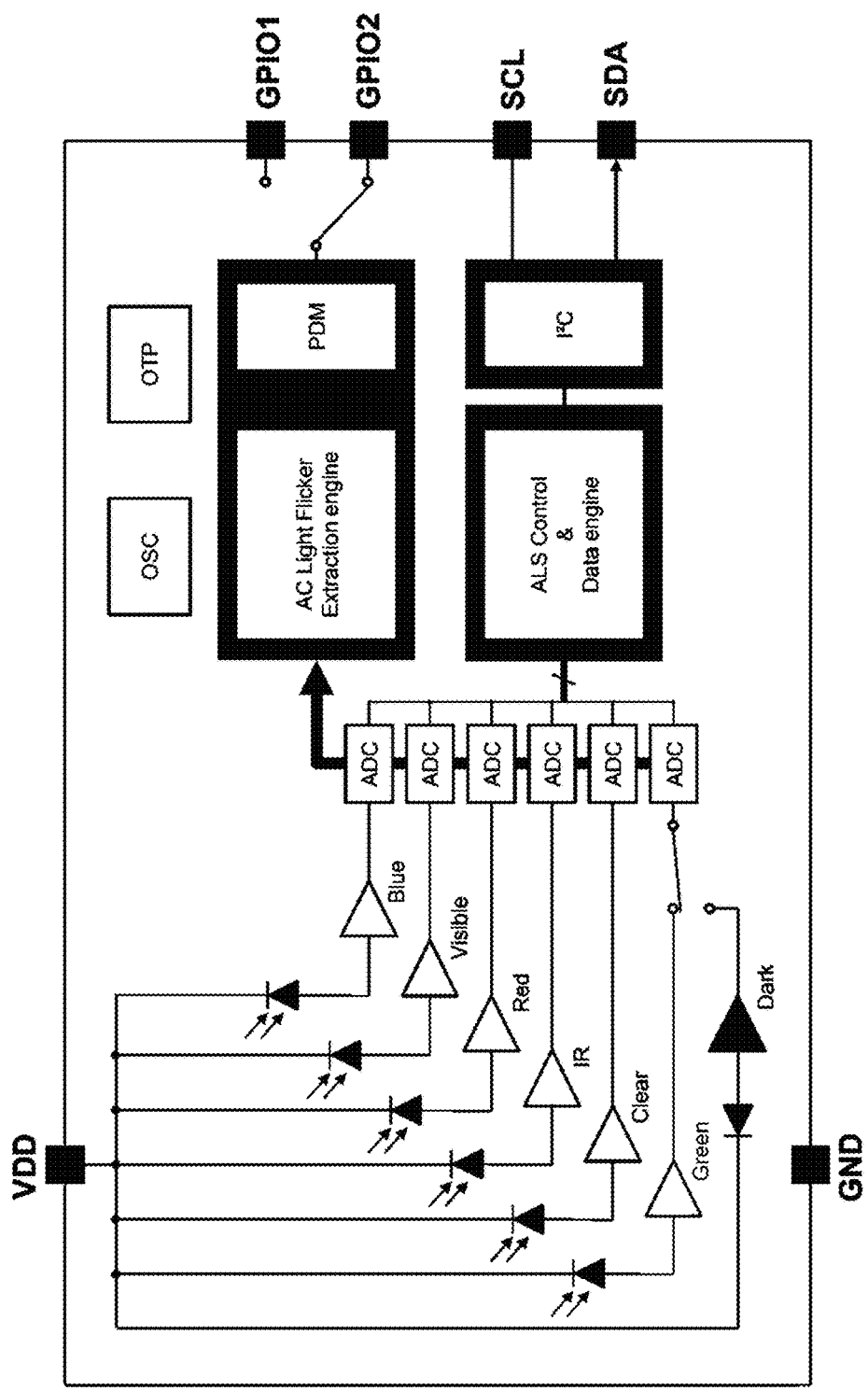

FIG. 2 is a block diagram of a commercial product[2] that can determine the correlated color temperature (CCT), brightness, and approximate color of light incident on a set of filters and detectors.

[2] ST Microelectronics product VD6283TX

The system shown in FIG. 2 features six detectors which are filtered to let the detectors sense red, green, blue, near infrared (IR) and all visible light and convert it to digital signals using an ADC at the output of each corresponding amplifier. This product also determines flicker parameters. Although this device performs digital data capture, it does not provide information of the type of light source that is being measured. Providing the correlated color temperature and color does not constitute identifying the light source. Installing such a device on a satellite would not provide the user information about the type of night-time illumination source at the surface of the Earth.

It would be advantageous, hence, to (1) produce a system for characterizing light emitted from the Earth that is small, lightweight, and inexpensive not to burden the load of a nanosatellite, and (2) develop a method of analysis performed by the system that reduces the data load that is to be communicated to Earth, while still providing useful information about light pollution.

BRIEF DESCRIPTION OF THE INVENTION

This application discloses several embodiments of a system and a method used to capture a mixture of light emissions from illumination sources of different illumination source categories and to accurately categorize the types of illumination source and the contribution of each type to the mixture. One of the applications of the disclosed apparatus and method is in capturing light mixtures emitted from the Earth and detected by a satellite in low Earth orbit. The disclosed system is used to estimate the absolute intensity and the individual contribution of each of a number of known illumination sources emitting light into space. As the satellite orbits Earth, the system is able to provide data from which a global map of light pollution may be created.

Global light pollution data are presently available from a number of satellite-based systems which detect night-time emission from the surface of the Earth. However, no nanosatellite has been able to provide such data, and no system has been demonstrated that "unmixes" the captured light into the categories of illumination sources that generate the light mixture captured and detected by a sensing system on a satellite. This application discloses such a system that in addition to performing the unmixing of illumination sources is significantly smaller, lighter, and less expensive than traditional satellite sensing equipment.

Light-Pollution Characterization Module

The light-pollution characterization module (LPC module) disclosed herein provides information about the light emitted from a multiplicity of illumination sources captured by a set of detectors integral to the LPC module. The data captured contains certain information about the light (color) spectrum of the emitted light and certain information about the temporal fluctuations of the captured light in the form of a flicker spectrum. The data are captured periodically and hence, as the satellite moves along its orbit, can be associated with different locations on the surface of the Earth. The association is made with a processed version of the intensity levels of light received by the module. First, light within each of a finite set of spectral segments is detected in a series of optical channels, with the use of optical bandpass filtered detectors. Next, the output from each detector is sampled to yield a sequence of intensity levels for that corresponding channel's spectral segment over a set time interval, the sampled data is converted from the time domain to the frequency domain to yield a sequence of flicker intensity levels as a function of frequency, from which a relatively small number of flicker values may be extracted at one or more selected frequencies. In an extreme case, only the DC value for each optical channel is extracted, but as will be discussed in more detail below, it is very beneficial to also extract the value of at least one to three or more harmonics of an expected[3] fundamental flicker frequency.

[3] Related to power line frequency at the location of operation of the light source(s) emitting the light being detected The disclosed method uses the extracted DC and (preferably) flicker harmonic data values provided by an LPC module to carry out what may be categorized as a constrained sub-pixel unmixing process in which the captured light is taken to be a linear weighted mixture of emission spectra of known reference sources referred to as targets, and in which the weighting factors (individual contributions) are not known but need to be determined. These weighting factors are referred to as "target abundances". The emission spectra of the known reference light sources are referred to as reference spectra and unlike conventional target information that contains information only about the optical spectra and is common in remote sensing industry, in this disclosed apparatus and method, the temporal fluctuation of light intensity is assessed and used in the unmixing algorithm. The use of flicker frequency amplitudes (flicker spectra) in the analysis improves the accuracy of the unmixing process and consequently reduces the number of filters and detectors required to achieve a given accuracy.

The emission spectra of illumination sources are each a continuous function of the wavelength and are in the process of measurement digitized into segments. If the measurement is performed with a spectrometer the intensity of the emission at each wavelength segment detected by a sensor detector represents a value of intensity at that specific wavelength. When discussing spectrometer light-capture, we generally consider that the emission spectra has been captured with a continuous sequence of detectors, or stated differently, the emission spectra are captured contiguous and are generally averaged in each pixel depending on the resolution of the spectrometer.

In this application, the light reaching the LPC module is filtered through a finite set of optical filters where each filter is followed by an associated detector. The filter, optional lens, and detector form a detection channel. Each detection channel has a responsivity spectrum, which is determined by the combined effect of the filter optical transmission characteristic and the responsivity characteristic of the associated detector. Therefore, each and all detecting channels have band pass characteristics which may be narrow band (tens of nanometers full-width at half-maximum) or broad band (hundreds of nanometers). The channel detection spectra are generally non-contiguous but may in some cases overlap. The choice of the filter center wavelengths and their full-width at half-maximum is a part of the invention.

Spectral Range

The human vision spectrum extends from approximately from 370 nm to 780 nm (which may be referred to as the photopic range). Radiometric quantities can be practically converted to photometric quantities within this wavelength range which is defined as the range within which photopic spectral luminous efficiency curve $V(\lambda)$ is greater than 0.00001. Some illumination sources, such as discharge lamps, emit radiation outside of this range, detectable using radiometers (photodetectors) and photometers. For example, a high-pressure sodium discharge lamp exhibits a strong emission at 819 nm, while a high-pressure mercury lamp exhibits a strong emission in the 365 nm range. Both examples are outside of the human vision spectrum. The fact that the human eye cannot see 819 nm light does not prevent the disclosed method from measuring emissions at that wavelength or at any other wavelengths outside the visible light spectrum to accomplish the task of identifying a light source. In fact, this is an added strength of the disclosed method.

The disclosed light-pollution characterization module captures spectral segments (defined for each channel) within a portion of the electromagnetic spectrum referred to as analysis spectrum range, expressed in terms of its boundaries: the shortest wavelength $\lambda_{min}$ and the longest wavelength $\lambda_{max}$. The LPC system may capture or analyze all, a portion, or a multiplicity of segments of the electromagnetic spectrum within the analysis spectrum range. In one embodiment, the analysis spectrum range is larger than human vision spectrum ($\lambda_{min}$<370 nm and $\lambda_{max}$>780 nm). In this application, we shall exclusively work with radiometric quantities because the spectral analysis range exceeds the optical range visible to the human eye. Therefore, any eventual conversions to luminance will exclude readings at filters with center wavelengths that are outside the visible wavelength range of the human eye. The invention may be applied more narrowly, to only consider the visible optical spectrum range, without departing from the spirit of the invention.

Flicker Spectrum

The term flicker in relation to light emission refers to observable periodic fluctuations of the intensity output by the light sources.

For example, the light coming from incandescent and discharge lamps is intrinsically modulated at a frequency that is twice the power line frequency as the intensity is the product of voltage and current, which periodically oscillate at the power line frequency. The variation in light intensity from discharge lamps is generally not simply sinusoidal, and hence the flicker spectra of discharge lamps exhibit substantial harmonic content. The power-line frequencies used in the world today are 50 Hz and 60 Hz. This means that the light intensity modulation for some sources will exhibit harmonics of 100 Hz and 120 Hz. Both these fundamental tones and their harmonics appear in the flicker temporal intensity. IEEE standard 1789™-2015 specifically deals with this issue.

The frequencies present in light intensity of solid-state lighting may be proportional to the oscillation frequency of the DC/DC converter that is being used and that converter oscillation frequency is defined by the manufacturer. Some illumination sources, such as oil or gas lamps, have no flicker, as defined above in terms of periodic fluctuations, but rather exhibit aperiodic, random fluctuations in intensity.

The flicker-spectrum harmonic content is used in the unmixing algorithm disclosed in this application to identify the type of light source in addition to the optical emission spectrum segments.

As noted above, inasmuch as public illumination is more cost-sensitive than indoor illumination, control of flicker in the former has been a less important requirement. The result is that one is more likely to observe high flicker lamps being installed in outdoor illumination installations. This is advantageous from the viewpoint of the present invention, as it means flicker may be used for identifying outdoor illumination sources. The disclosed light-pollution characterization system uses both power color intensity spectrum and flicker spectrum information to perform unmixing of detected light.

We shall refer to the flicker intensity spectrum as the "flicker spectrum" to differentiate it from the "light spectrum" which refers to the electromagnetic spectrum at a much higher frequency range (THz). The flicker spectrum or power spectral density of the flicker fluctuation is evaluated from the temporal data by any of the known methods for spectral density estimation (SDE) known in the art.

Figure 3A:
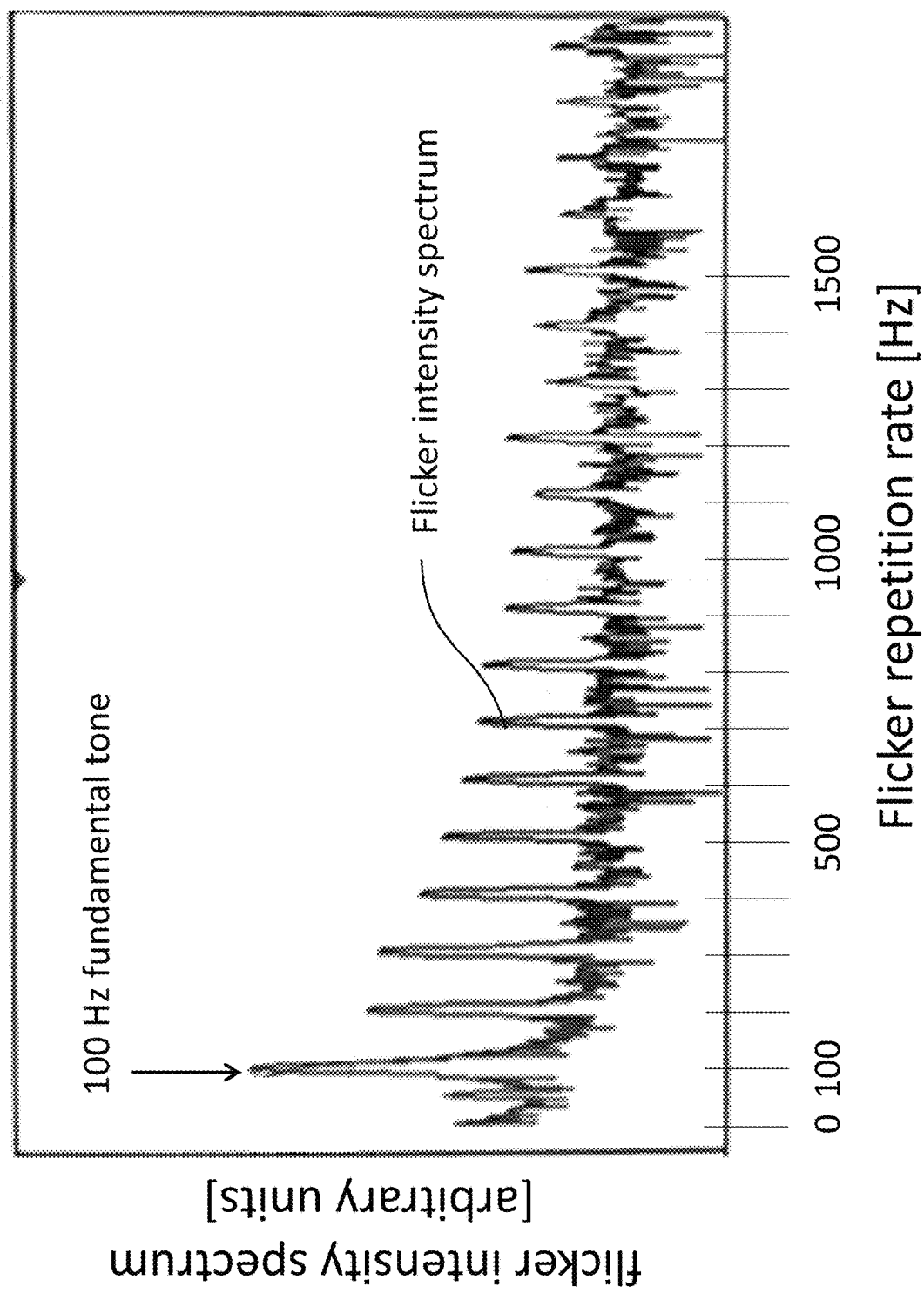
Figure 3B:
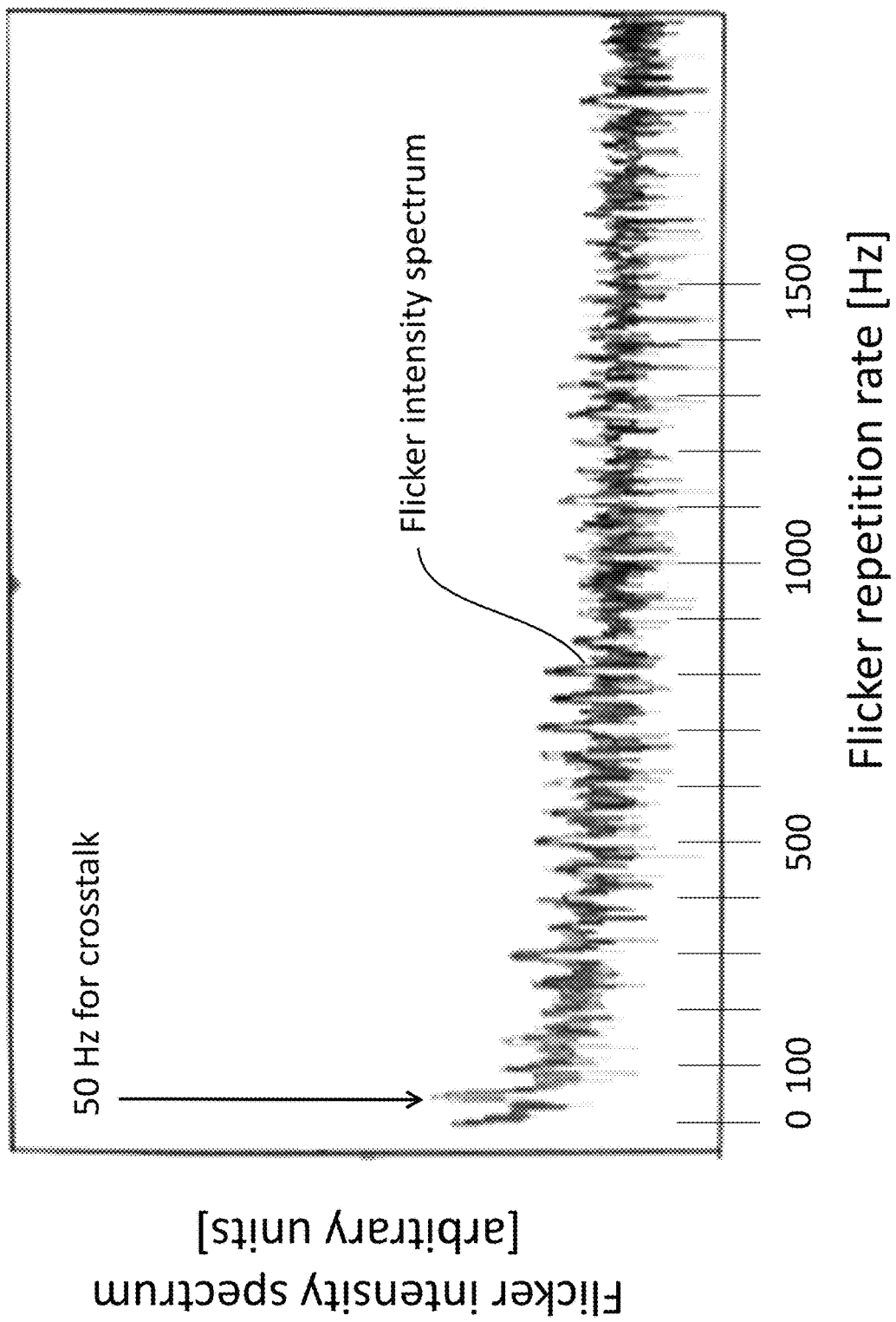

FIG. 3A shows an example of a flicker intensity spectrum which is the Fourier transform of the temporal flicker signal (flicker waveform in time), as measured for a commercial high-pressure sodium lamp. Clearly, the fundamental tone is at 100 Hz (as found in Europe) and multiple harmonics appear in the flicker spectrum above that. FIG. 3B shows the same type of measurement using the same measurement system and the same lamp as in FIG. 3A, but with the lamp turned off to reveal background noise, which clearly shows the presence of a 50 Hz signal and associated harmonics, generally associated with electrical crosstalk, and not flicker.

The essential metric used in this work is flicker frequency content: amplitudes at a number of harmonics or selected frequency components in addition to the DC or continuous average value. This approach to quantifying flicker is very different from the more common flicker metrics used in the industry (flicker index and percent) and provides more data. Flicker index and flicker percent are two parameters that characterize any illumination sources in addition to the average light intensity, but they do not provide any information about light intensity waveform shape, whereas harmonics do.

Using flicker spectra, on the other hand, provides a number of harmonics that approximate the shape of the intensity waveform and one can choose how many to include in the description of the intensity waveform. As shown in FIG. 3A, it is clear that the high-pressure sodium lamp can be characterized not only by the DC value (average intensity for a given channel's filtered wavelength range), but also by at least 15 more harmonic amplitudes (for that same channel's filtered wavelength range). This allows for a yield of 16 parameters to characterize one type of lamp. Using flicker spectrum estimation to characterize illumination sources provides significantly more data to be used in the identification of the light source identification.

Data Acquired Per Measurement

The essential assumption of the disclosed measurement method and apparatus is that any mixture of light to be detected by the LPC module is a linear superposition of illumination sources and that at least M illumination sources of those measured are known, namely, that the response of the LPC system to being illuminated by each of the known M sources is known. These responses are referred to as reference illumination source data or reference spectra. Note that sources within the same general category—the category of fluorescent lamps, for example—of different models and/or made by different manufacturers may emit light with significantly different spectral and flicker characteristics, and therefore should be considered as different sources.

For the purposes of this disclosure, we shall assume that the measurement of an emission spectrum of any reference source m, or the measurement of a mixture of light, is represented with N electrical signals proportional to the intensity detected within N spectral segments using N detectors that convert light to current. Each of the N signals is sampled over a period of time and contains temporal fluctuation. The rate of sampling of this temporally varying signal is a design parameter and the analysis performed on this samples signal is a part of the innovation disclosed in this application.

In one embodiment, the samples values of each of the N signals from N detectors are digitized, saved, and sent to Earth for analysis. In another embodiment, the analysis is performed on the satellite in order to reduce the amount of captured data to be sent to Earth. This data reduction is performed by performing spectral estimation on each of the channels. For each of the N channels, there are N components that provide DC value, and then for each channel L flicker-spectral components (selected higher frequency amplitudes). Each channel n of the N optical spectrum channels is characterized by an average or DC value of intensity $I_0(n)$ and a number of intensity values corresponding to higher flicker frequency components numbered as $I_1(n)$, $I_2(n)$, etc. The total number of reduced data points of the channel n, may be different for each of the n channels.

The reference spectra mentioned above should ideally contain every possible illumination source emitting light towards the sky and that could be detected by a LEO satellite. Clearly, this is not possible nor practical: every manufacturer of illumination sources has a different design, while manufacturing fluctuation makes them all slightly different. The practical alternative is to create a reference spectra data base or data bank that contains the most represented categories of light sources and that the set is large enough to provide sufficient accuracy for at least those sources that we are interested in. Selecting and building the reference spectra data bank is part of invention.

In order to create the reference spectra data base, every selected optical illumination source (reference source) must be characterized with the radiance captured in each of N optical spectral segments and the detected signal analyzed by performing an FFT algorithm (or any other spectral estimation method) and selecting the flicker frequency components or segments to create the data bank that will be used for the unmixing algorithm.

LPC System Block Diagram

Figure 4:
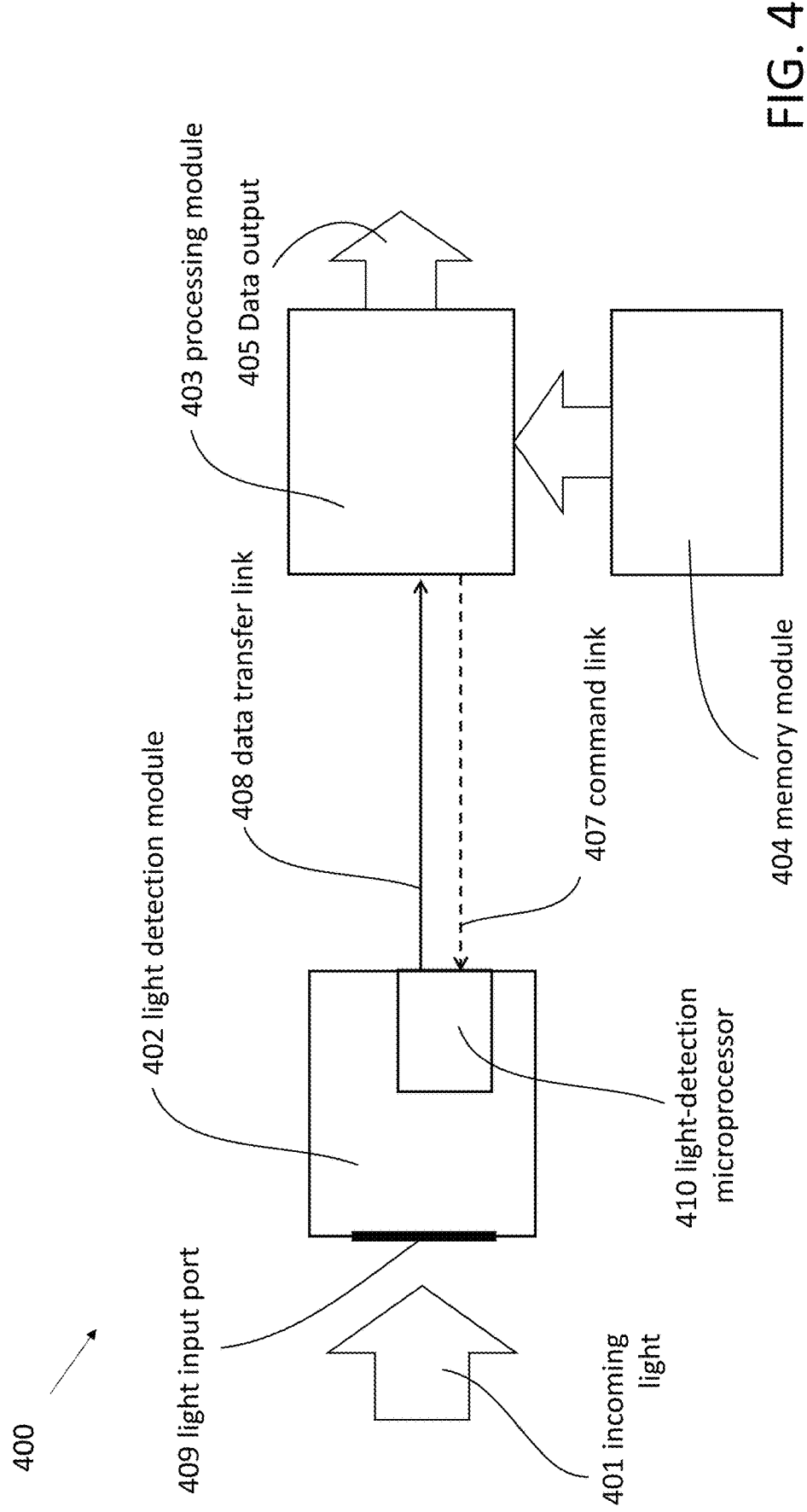

FIG. 4 illustrates a block diagram of one embodiment of an LPC system 400, which depends on receiving incoming light 401 at an LPC module of the type discussed above. The light detection module 402 has a light input port 409 and it is operatively configured to capture and digitize the optical spectrum and its temporal fluctuation of the light 401 incident on the optical input port 409. The light detection module 402 is operatively configured to perform spectral analysis on the flicker fluctuation, namely, it has FFT computation capability within the microprocessor 410. The light detection module 402 is coupled to a processing module 403 operatively configured to perform unmixing of the measured data and deliver results while using the reference data stored in memory module 404. The result of the unmixing is an array of real numbers $x_m$ (m=1, 2, . . . M), each of which represents the fraction of a known illumination source (for m>0) in the measured mixture. The real numbers $x_m$ are sometimes referred to as the target abundances.

In one embodiment, the light-detection processor 410 and processing module 403 are the same processor.

The analysis spectrum range is measured in discrete spectral segments (channels) and is generally larger than the human vision spectrum. As noted previously, the spectral segments do not have to be contiguous and may overlap. The number N and central wavelengths and widths of the N spectral channels or segments is chosen to optimally represent the emission spectra of conventional optical sources.

The selection of central wavelengths and bandwidths of the spectral channels is a part of the invention.

The flicker (light intensity fluctuation) of at least one spectral channel is characterized. The intensity fluctuation is converted to flicker spectrum data using the FFT algorithm and specific harmonic amplitudes are noted and saved. The rest of the temporal data is discarded.

The calibration of the LPC system is performed using the module itself, by measuring each of the possible light sources by the module itself. This is referred to self-calibration and when it is done on every module, it eliminates all the imperfections and manufacturing variations of the LPC system. When it is done on just a sample basis, it eliminates all of the systematic errors and imperfections the light measurement system will have.

In one embodiment, the light detection module 402 and the processing module 403 are housed in the same location as they would be when the module is calibrated, while in another embodiment they are distant from each other. In either case there is a data transfer link 408 implemented between them. Optionally there is a command link 407 used to allow the processing module 403 to send instructions to the light detection module 402. The data transfer link 408 and optional command link 407 may be implemented as wired electrical connection, wireless communication link, free-space optical communication link or fiberoptic communication link.

The reference illumination data is acquired and stored in the memory module 404. The data acquisition is preferably performed using an LPC system that will also be used in normal operation, but different LPC systems can be used for these two steps, and it also possible to create the illumination reference block using a different acquisition equipment without departing from the spirit of the invention. The issues related to calibration, errors, and using different equipment shall be discussed in the section on detailed description of the invention.

For purposes of this application, a vehicle that may house at least the light detection module of the LPC system can be one of more of the following: a satellite, an airplane, a drone (UAV), a balloon, or an automobile. Furthermore, the disclosed LPC system may be housed in a mobile hand-carry housing. The disclosed LPC system can function and provide results from all of these vehicle choices.

In one embodiment, the LPC system comprises said light detection module installed on a low-Earth orbit satellite in occasional radiofrequency communication with at least one Earth station to which the light detection module delivers the collected data, and a processing module, located at the base station or in a remote location that analyzes the data sent by the light detection module on the satellite and delivers the results of the unmixing method.

In another embodiment, the LPC system is installed on a low-Earth orbit satellite in sporadic radiofrequency communication with at least one Earth station to which the LPC system delivers the results of the unmixing method. This means that the processing module 403 using the reference data stored in 404 operates in orbit and the results are sent to Earth.

This application discloses a system and a method to unmix the light emitted from the illumination sources on the surface of the Earth. The result of unmixing is a set of numbers, a vector with M elements, where M is the number of reference sources data sets, one reference source data set per type of illumination source that is expected to appear in the measurement. The method comprises of an algorithm that uses measured reference data for each of the light sources expected to appear in the world and unmix them yielding fractions of each source from the sum. In one embodiment, as the satellite orbits around the Earth and provides data on the character of the light emitted from the Earth is associated with satellite position (geographic coordinates) which are then used to create a global map of light sources.

In one embodiment, the principle of operation of the LPC system is explained as follows: the LPC module uses N detectors behind N different bandpass filters to capture incident light in N discrete non-overlapping spectral bands, referred to as channels. The spectral bands are segments of the spectrum and are defined by the transmission characteristics of the N filters. Each channel contains an optical bandpass filter in front of a detector that can detect the light transmitted through the filter and converts it into a current which is then amplified in a transimpedance amplifier (one for each channel) and converted to a voltage signal of sufficient amplitude to be digitized with an analog-to-digital converter. The process of conversion from current to voltage may include an integrator circuit or a transimpedance amplifier. The light pollution module is used in one of two modes: calibration mode and measurement mode.

In the calibration mode, the LPC module is sequentially illuminated with M different illumination sources, one at a time, and for every light source m ($1 \leq m \leq M$) illuminating the LPC module, the LPC module produces a response in form of a vector y(m), each vector has K elements which are generally non-negative real numbers. Of those K elements, N of the elements are DC response of N different optical spectrum channels, and the other L are flicker frequency (flicker) components the optical channels. The vector y(m) is referred to as the reference target for light source m.

During the calibration procedure one measures M different light sources. All measurement vectors y(m) acquired during the calibration are used to form matrix S which we refer to as the reference data block with K×M data points (K spectrum segments and flicker components for each of M different light sources) saved in memory module 404 in FIG. 4.

In the normal operating procedure, the LPC module makes a measurement of a light mixture obtaining measurement vector y (a K-element measurement vector). The LPC system further executes an unmixing algorithm (described in this application), which effectively compares the measurement vector y with all the vectors saved in the reference data block S to deliver a vector of fractions x, where x vector has M elements, and each element is the amount of fractional contribution of each vector from the reference data block which combined yield a close approximation of the measurement vector y.

To illustrate this analytically, the result of the algorithm is a vector x with M-elements $x_m$ (m=1, 2, 3 . . . M). The assumption is that the measured vector y can be written as a linear superposition of at least some, if not all, reference data vectors given in matrix S:

$$y_k = \sum_{m=1}^{M} x_m s_{k,m} \tag{1}$$

where $y_k$ is the k-th component of vector y and $s_{k,m}$ is the k-th component of m-th column of the reference matrix S. Each of the factors $x_m$ is a fraction of how much of the source m has been found in the measured k-element of vector y. In other words, the elements $x_m$ are the fractions of the reference illumination sources present in that measured mixture. This unmixing procedure would be simple if the vectors of the reference illumination sources were mutually orthogonal and if M=K, but this very rarely the case and hence the procedure must be generalized and we must assume that each light source m has a different emission spectrum.

BRIEF DESCRIPTIONS OF THE FIGURES

FIG. 1. Illustration of flicker attributes flicker percent and flicker index.

FIG. 2. Block diagram of a commercially available the ambient light sensor (PRIOR ART)

FIG. 3A. An example of a flicker intensity spectrum measured from a high-pressure sodium lamp, with the lamp powered on.

FIG. 3B. An example of a flicker intensity spectrum measured from the lamp of FIG. 3A, with the lamp powered off.

FIG. 4. A light-pollution characterization (LPC) system according to one embodiment of the present invention.

Figure 5:
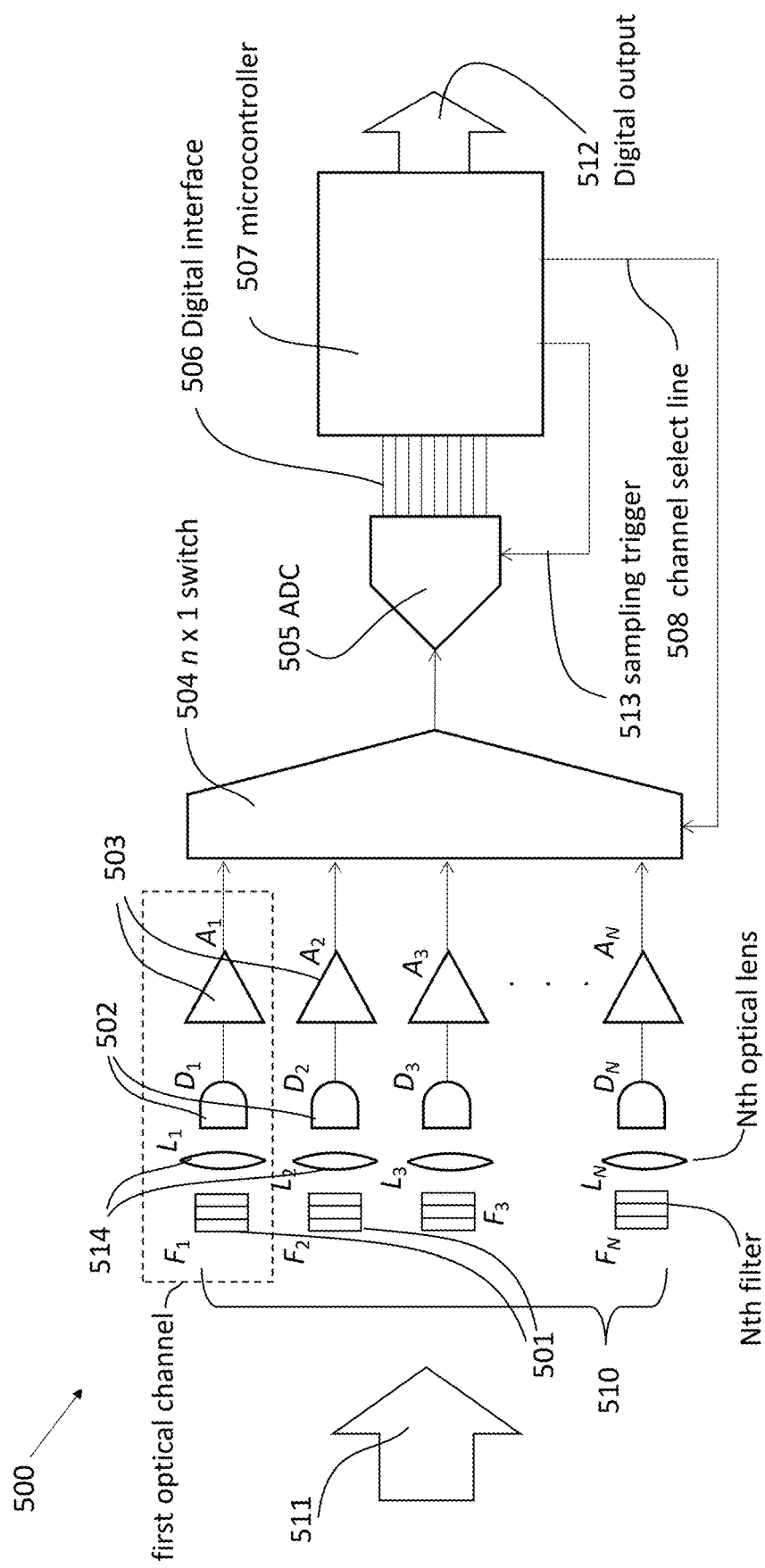

FIG. 5. An LPC module according to one embodiment of the present invention.

Figure 6:
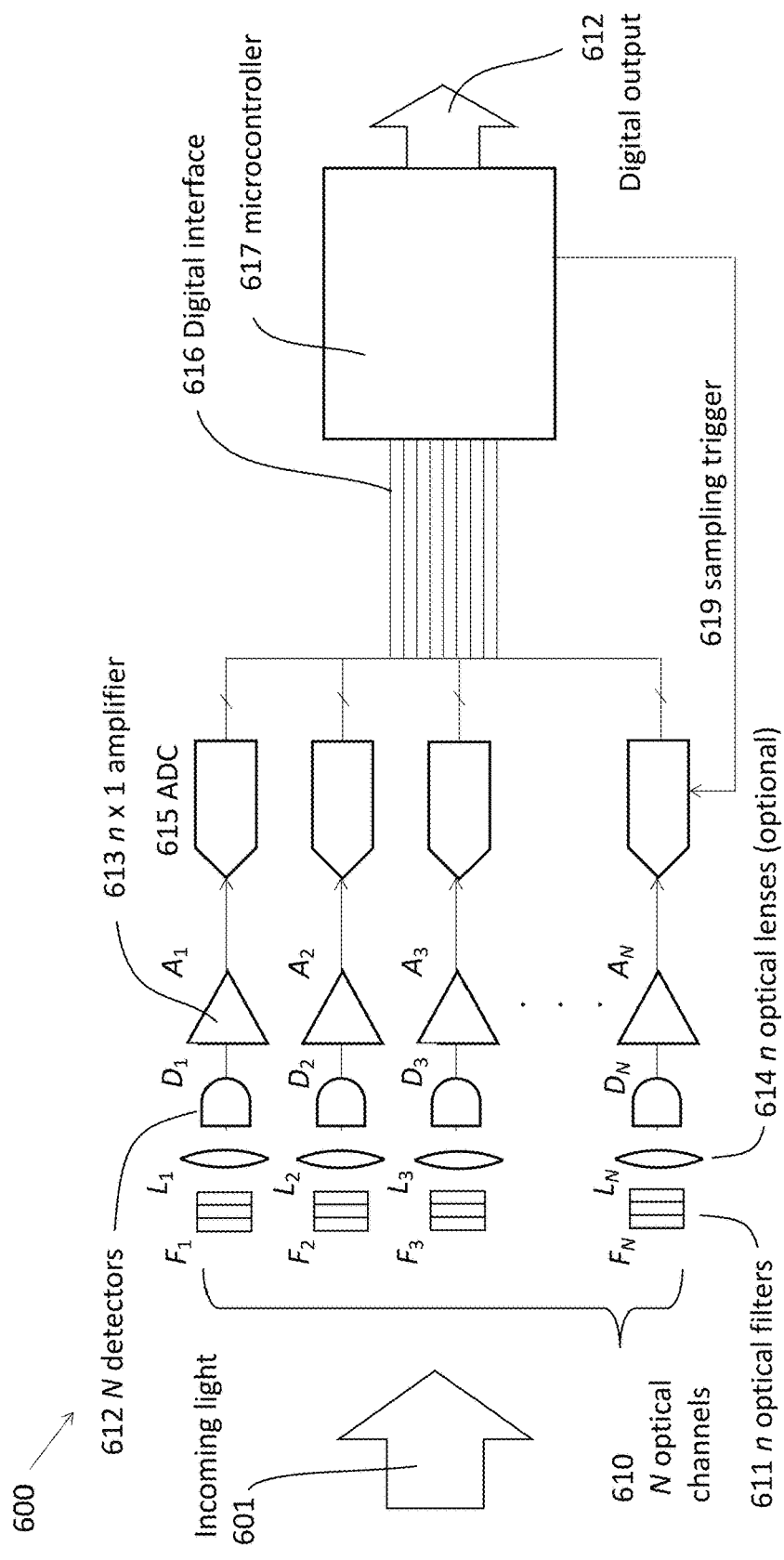

FIG. 6. An LPC module according to another embodiment of the present invention.

Figure 7:
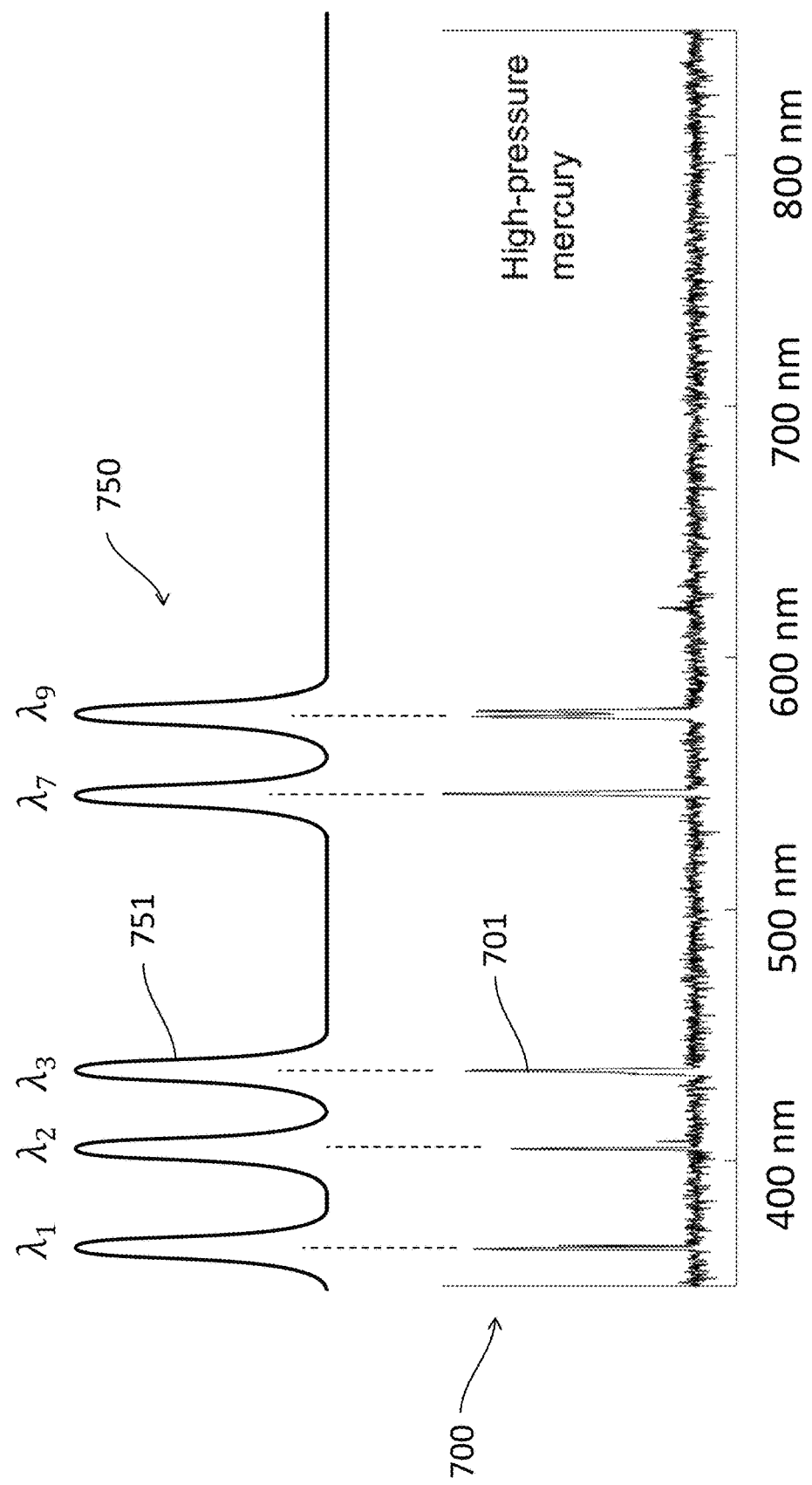

FIG. 7. Example of high-pressure mercury lamp optical emission spectra and selection of bandpass filters to be used to detect some of the emission peaks.

Figure 8:
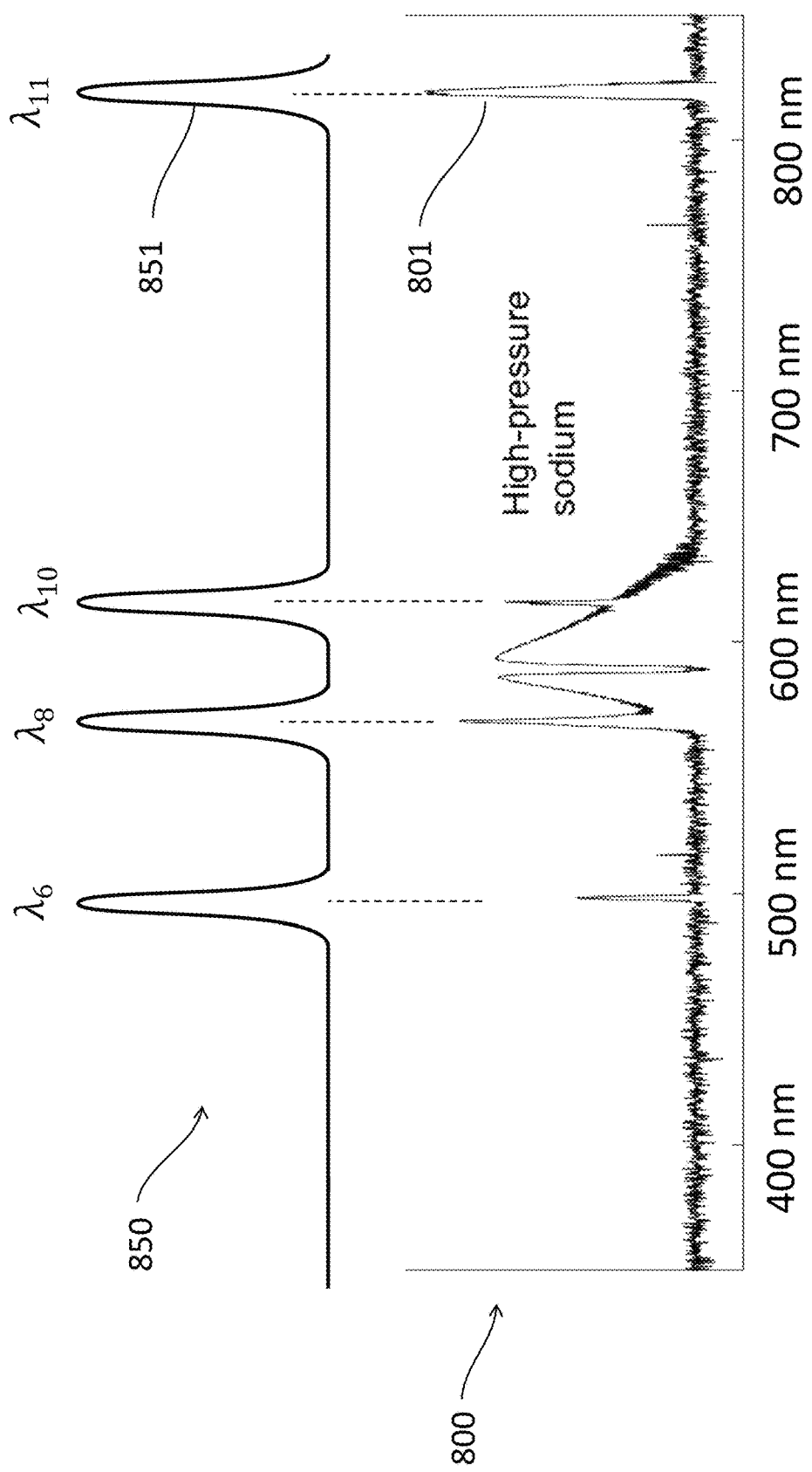

FIG. 8. Example of high-pressure sodium lamp optical emission spectra and selection of bandpass filters to be used to detect some of the emission peaks.

Figure 9:
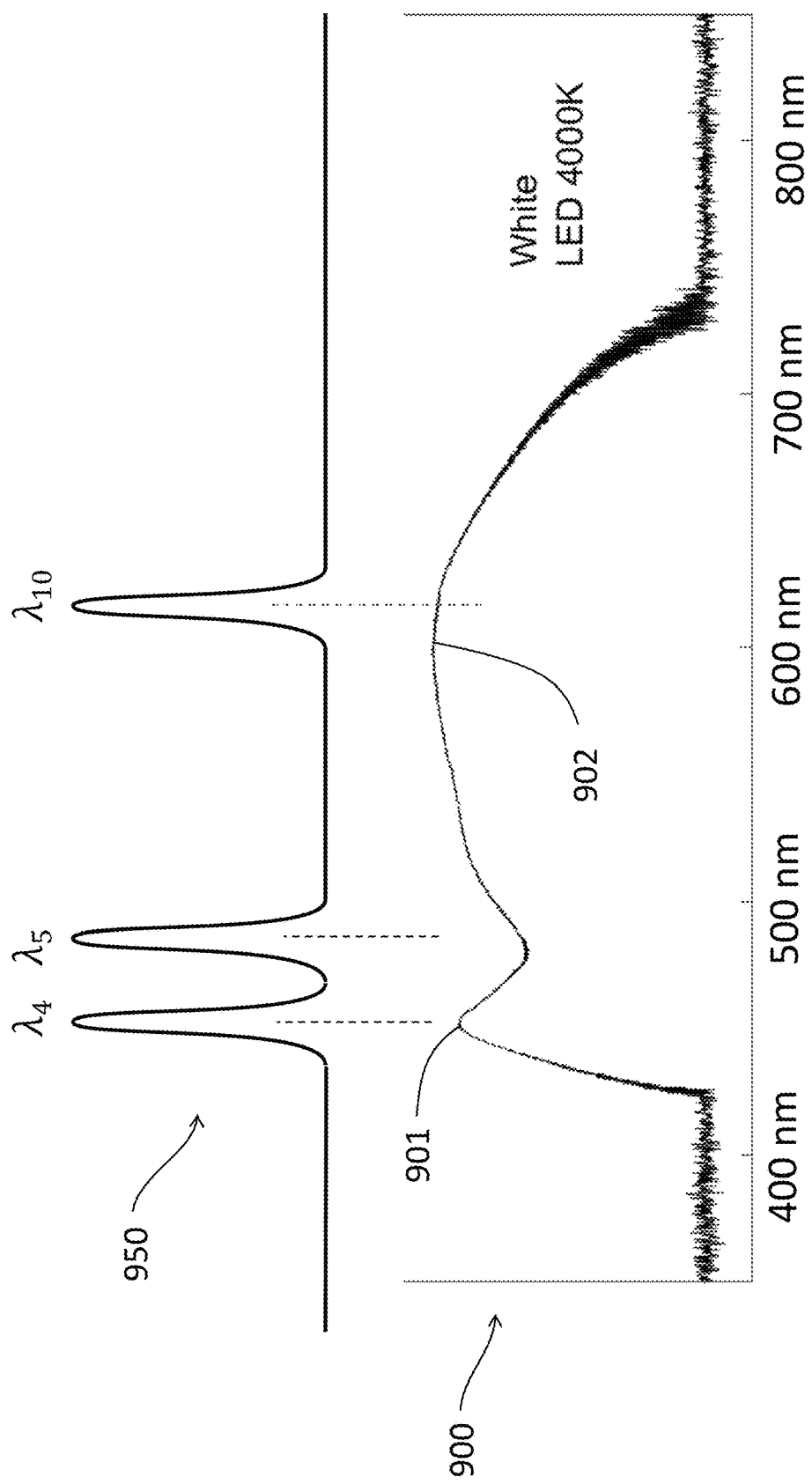

FIG. 9. Example of light-emitting diode lamp optical emission spectra and selection of bandpass filters to be used to detect some of the emission spectra characteristics.

Figure 10:
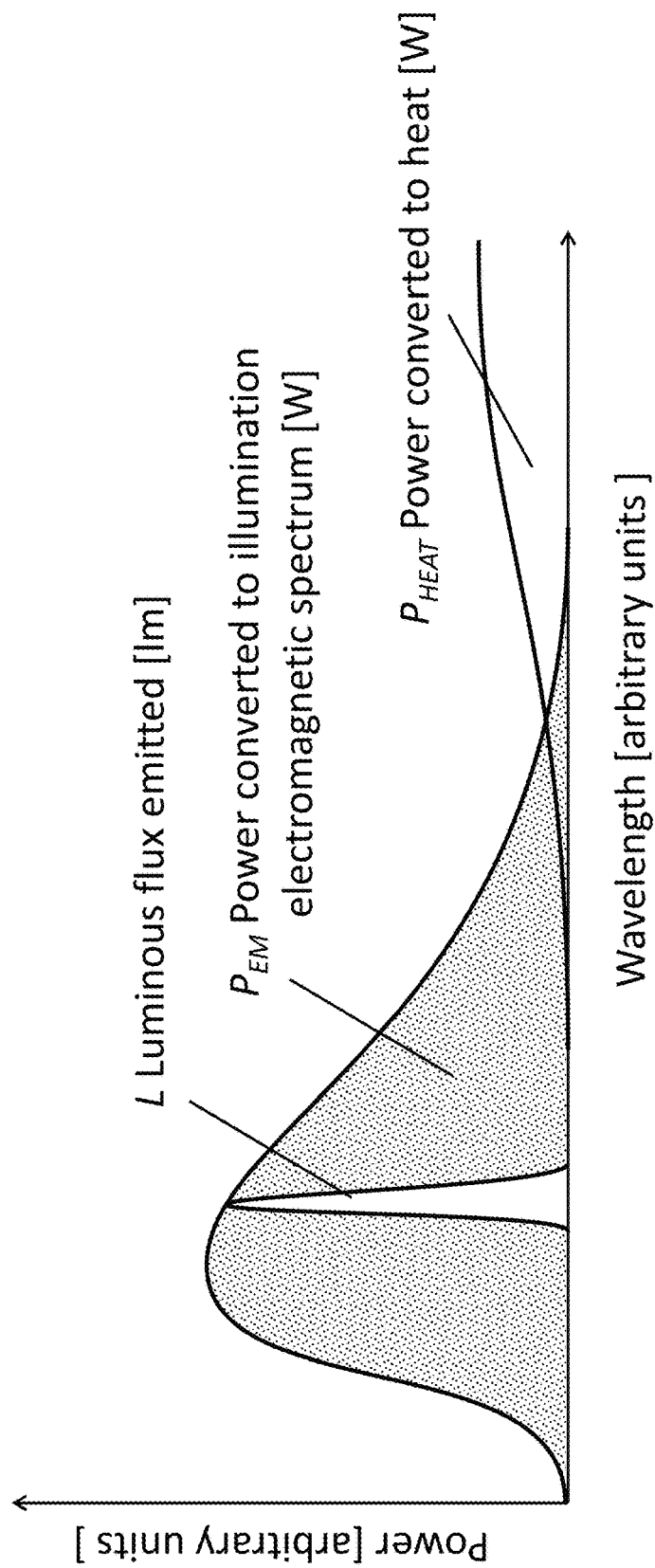

FIG. 10. An illustration of power balance in an illumination source's emission.

Figure 11:
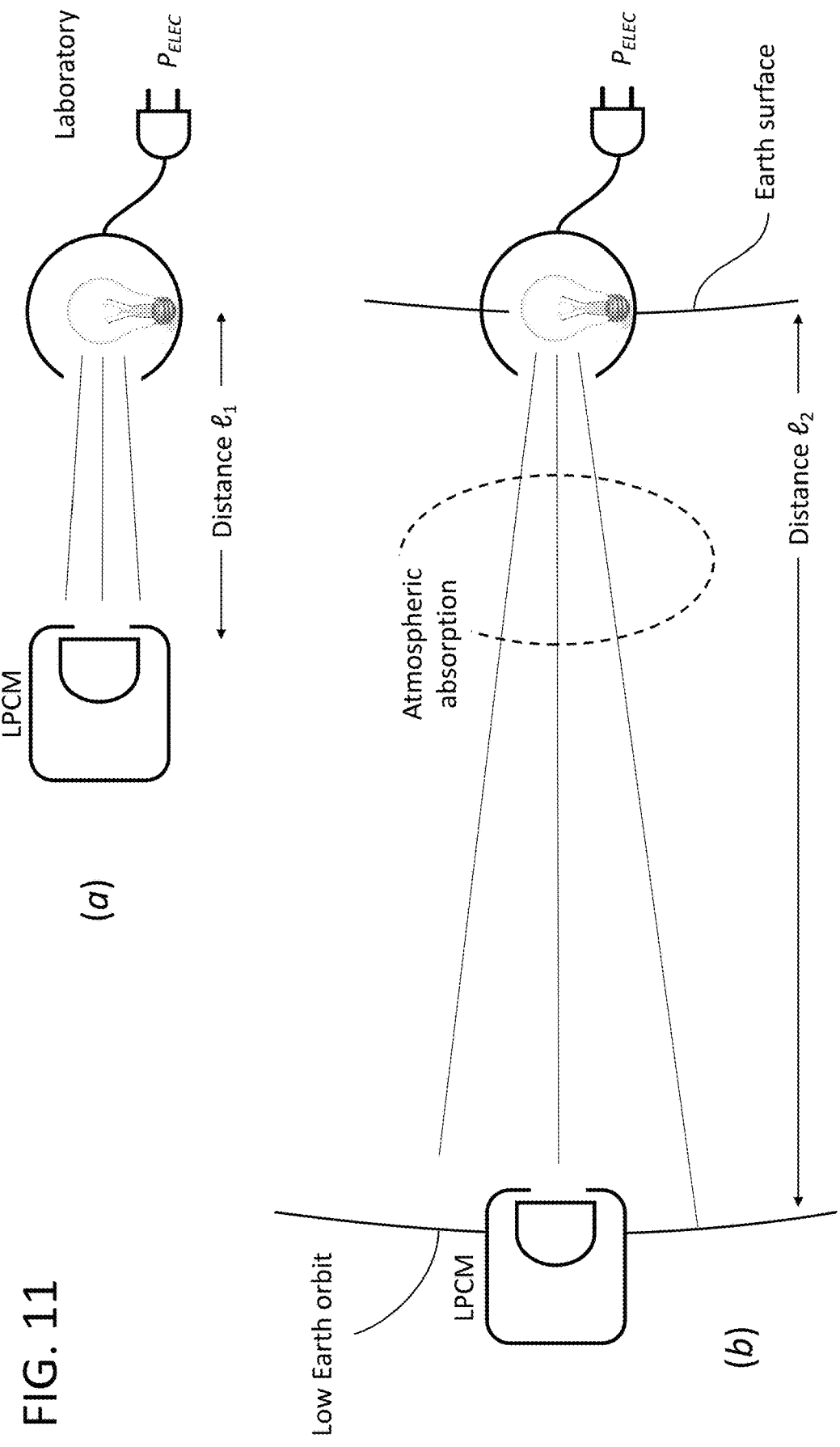

FIG. 11. Calibration mode in a laboratory and normal operation mode of the LPC system in low Earth orbit.

FIG. 12 A non-limiting example of F=20 filters that are a choice for selection.

Figure 13:
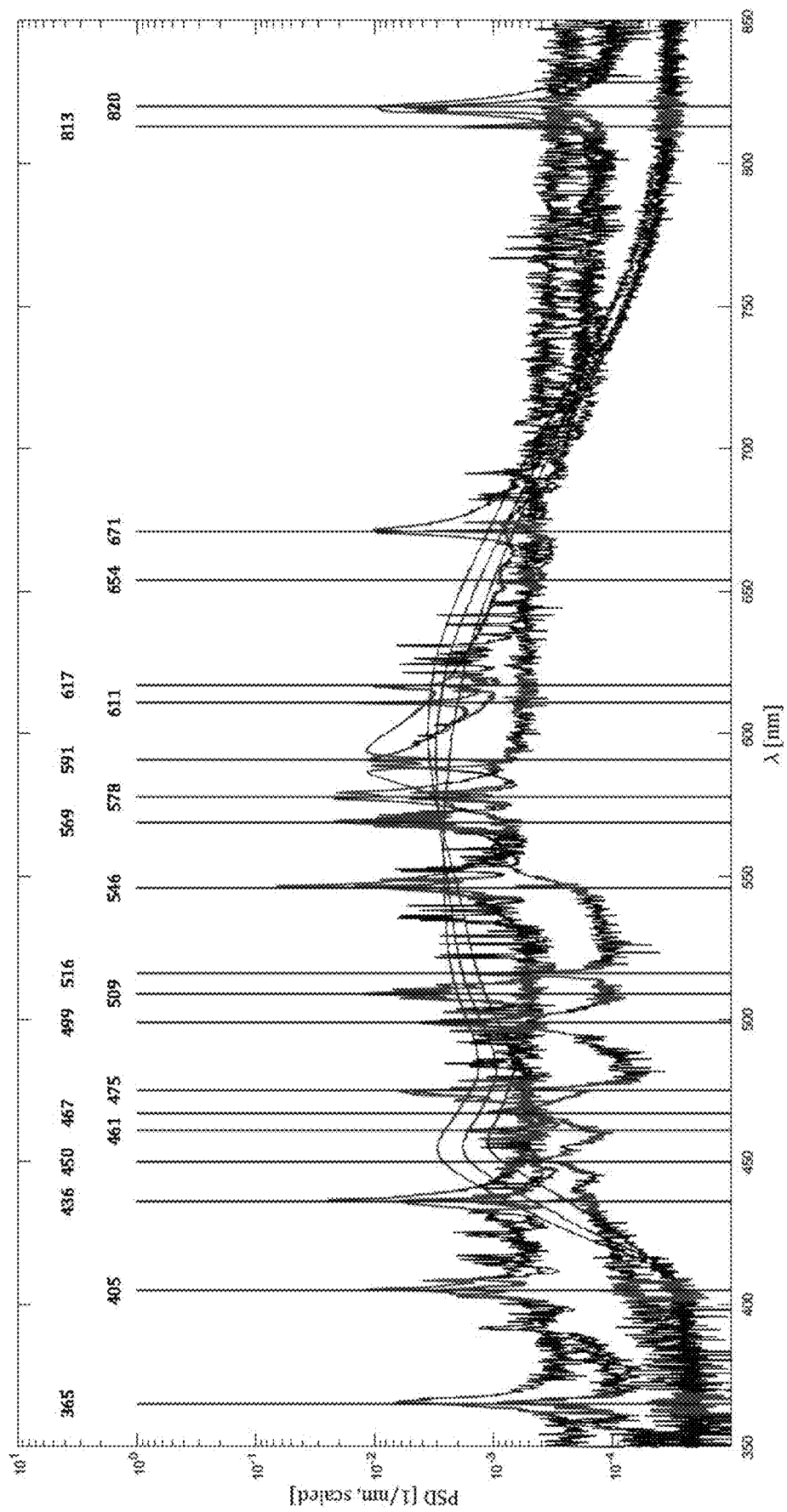

FIG. 13 Illustration of M=7 illumination sources spectra overlapped with the M=20 filters shown in FIG. 12.

Figure 14:
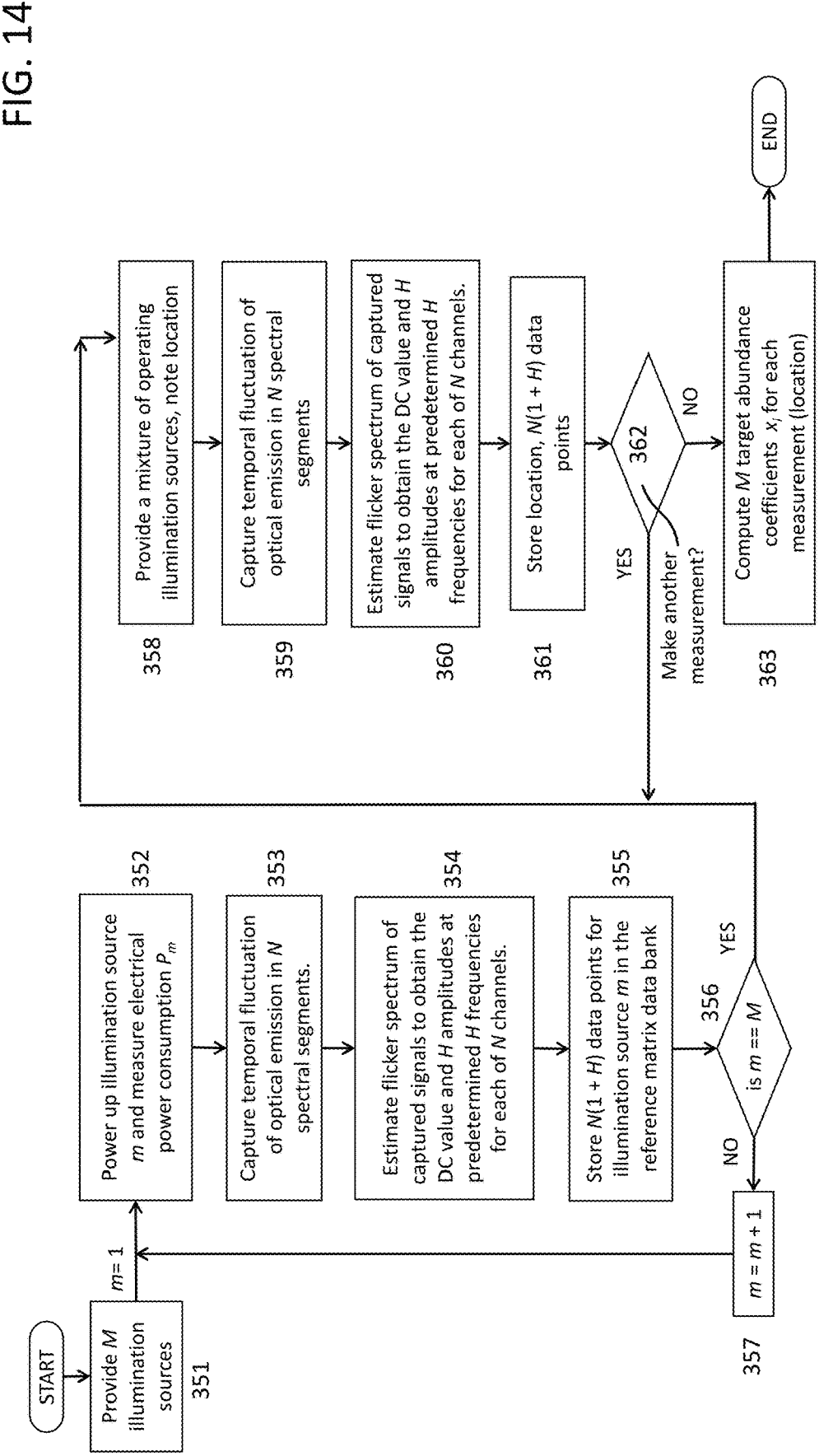

FIG. 14. Method for practicing the invention flow chart.

DETAILED DESCRIPTION OF THE INVENTION

Definitions

The innovative system disclosed in this patent application is referred to as a light-pollution characterization system (LPC system) although it will be clear that this disclosed apparatus and methods employed can be applied to any other illumination unmixing task without departing from the spirit of the invention. The LPC system comprises a light detection module, a processing module, and a memory module with reference information for each illumination source that is to be detected.

Measured light is assumed to comprise a mixture of M known and unknown illumination sources. The former (known) produce mutually uncorrelated light streams and the latter (unknown) are considered to be noise in the measurement. The method assumes that the known sources can be identified in the mixture if their characteristics (illumination source reference data for sources of the same types) are known prior to the unmixing analysis. If there are M known source types in the reference source data bank (matrix S), the result of the unmixing analysis is an array of real numbers $x_m$ (m=0, 1, 2, ... M), each of which represents the fraction of a known illumination source (for m>0) in the measured mixture. The sum of all coefficients $x_m$ ($\Sigma x_m$) is unity.

Single-Pixel Multi-Spectral Detection

FIG. 5. illustrates one embodiment of a light detection module 500 that detects and analyzes incoming light 511 and delivers measurement results at a digital output 512. The illustrated embodiment comprises N optical channels 510, only one outlined in a dashed box for clarity, each optical channel n comprising an optical filter $F_n$ (501), optical lens $L_n$ (514), optical detector $D_n$ (502), and amplifier $\lambda_n$ (503), where n=1, 2, 3, ... N. Only the components in just the first two channels are fully labeled, for clarity. While this embodiment shows the detector and amplifier as discrete components, in practice, some degree of amplification is usually built into photodetectors, and there may be no need for an additional amplifier 503. Incident light 511 is simultaneously and substantially equally incident on all N channel filters 501, lenses 514, and detectors 503. A portion of light incident on filter $F_n$ is transmitted through the filter $F_n$, focused with lens $L_n$, and detected on the detector $D_n$, and converted to a current which is then coupled to the input of amplifier $\lambda_n$ resulting in a voltage at the output of amplifier $\lambda_n$ that is substantially proportional to the optical intensity detected by detector $D_n$. The amplifier may be a transimpedance amplifier or an integrator, which may be gated.

The outputs from N amplifiers 503 are coupled to N input ports of an analog switch module 504, the output of the analog switch 504 is then fed into an analog-to-digital converter 505 (ADC) and the digital information from the ADC 505 is fed by a digital interface 506 into a microcontroller 507 that processes the measurement data and delivers the result at the output terminal 512 in digital form. The microcontroller 507 is programmed to control the sampling times of the ADC 505 via electrical connection 513 and the channel selection on the analog switch 504 using electrical connection 508.

FIG. 6 illustrates another embodiment of a light detection module 600 that detects and analyzes incoming light 601 and delivers measurement results at a digital output 612. The illustrated embodiment comprises N optical channels 610, each optical channel n comprising an optical filter $F_n$ (611), an optical lens $L_n$ (614), optical detector $D_n$ (612), and amplifier 613 denoted with $\lambda_n$, where n=1, 2, 3, ... N. As noted above, in some related embodiments, amplifier 613 may not be required. Incident light 601 is simultaneously and substantially equally incident on all N channel filters 611. A portion of light incident on filter $F_n$ is transmitted through the filter $F_n$, focused on the detector $D_n$ by the lens $L_n$. The light captured by each of the detector is converted to a current which is then coupled to the input of amplifier $\lambda_n$ resulting in a voltage at the output of amplifier $\lambda_n$ that is substantially proportional to the optical intensity detected by detector $D_n$. The amplifier may be a transimpedance amplifier or an integrator, which may be gated. FIG. 6 illustrates an embodiment of the light measurement module that is similar as the one shown in FIG. 5, while not using an analog selection switch 504. In this embodiment, each of the N channels has its own dedicated analog-to-digital converter 615 so that the selection between the channels is performed by the micro-controller digitally.

As in the previous embodiment, the system is operatively configured to acquire data by sampling all N channels 610 in time with a sampling rate and over a predetermined exposure time. The microcontroller triggers the measurement using trigger line 619 and acquires the data via the digital interface lines 616.

Both embodiments illustrated in FIG. 5 and FIG. 6 are operatively configured to acquire data by sampling all N channels in time with a sampling rate and over a predetermined time interval which will be referred to as the exposure time. During the exposure time, the microcontrollers 507 and 617 will acquire P values that represent temporal response for each channel. This sequence is referred to as $P_{k,n}$, where k is the ordinal number of the sample point in the sequence and n is the channel on which the sequence was taken. The microcontrollers are operatively configured to execute an FFT algorithm on $P_{k,n}$ sequence for each n of the N optical channels 501 to produce a flicker spectrum in digital form for each channel n and then sample this discrete flicker spectrum at predetermined flicker frequencies or frequency points. The total number of data points selected and stored is K, where it contains $K_{DC}$ DC values and $K_{AC}$ AC values which are sampled from the flicker spectrum at any predetermined frequency points. The number of channels corresponds to $K_{DC}$.

Optical Spectrum and Creation of the Reference Data Base

The N optical filters are each designed to transmit a segment of the optical spectrum of incident light. The segments of the optical spectrum are selected to provide partially orthogonal measurements of the incident light.

There are many commercially available illumination sources used in the world today which can be loosely categorized into (i) open flame or fire, (ii) incandescent sources in which a filament is heated to produce emission that approximates black-body radiation, (iii) gas discharge and fluorescent lamps, and (iv) solid-state lighting. To create a reference-spectrum base, one needs at least one spectrum of each of the illumination sources. Inasmuch as different types of light sources emit light with distinct spectral features, varying by design and manufacturing technology choices and manufacturing tolerance, present public illumination technologies span a wide range of light qualities and cost structures. This is particularly true with metal-halide lamps where the mixture of gases is often proprietary. This variability also applies to the solid-state sources as the ratio between blue and yellow portion of the spectra define the correlated color temperature and the phosphor choice is still under development and each manufacturer uses a different phosphor and a different blue light-emitting diode. The logic for selecting the wavelengths for the bandpass filters is illustrated with the help of FIGS. 7, 8, and 9.

Measured emission spectra 700 of a high-pressure mercury (HPM) lamp, shown in FIG. 7, exhibits several emission lines 701 which are characteristic for the mercury discharge. Clearly, one approach to detect mercury discharge is to pass the emitted light through a sequence of bandpass filters, each with characteristics illustrated with 751, and detect the presence of energy of that line. In 750 the selected lines are denoted with wavelengths $\lambda_1$, $\lambda_2$, $\lambda_3$, $\lambda_7$, $\lambda_9$.

Measured emission spectra 800 of high-pressure sodium (HPS) lamp, shown in FIG. 8, exhibits several emission lines 801 which are characteristic for the sodium discharge. Similarly, detecting sodium discharge can be performed by passing the light emitted by the HPS lamp through a sequence of bandpass filters, each with characteristics illustrated with 851, and detecting the presence of energy of that line. In 850, the select lines are denoted with wavelengths $\lambda_6$, $\lambda_8$, $\lambda_{10}$, $\lambda_{11}$.

Finally, detecting an LED emission is illustrated in FIG. 9 where an example of LED emission 900 is shown. The emission spectrum is continuous and exhibits at least two broad peaks, the blue peak 901 and the yellow peak 902. Clearly, detecting the power spectral density around these two peaks with a filter combination at $\lambda_4$, $\lambda_5$, $\lambda_{10}$, shown with 950, would provide evidence of a light-emitting diode emission.

With detectors placed behind filters with central wavelengths $\lambda_1$ to $\lambda_{11}$, one obtains 11 signal channels and, clearly, presence of signals at some wavelengths, as for example, $\lambda_1$ and $\lambda_{11}$, will uniquely detect the presence of the HPM and HPS lamps. When illumination from any of these light sources is measured using one of the LPC systems illustrated shown in FIG. 4A or 4B, we obtain a set of K measured values which include both DC and AC characteristics. In one embodiment, the filters are selected so that the central wavelengths $\lambda_n$ of a bandpass filter with bandwidth $\Delta\lambda_n$ coincide with the emission features of common illumination sources, as it has been shown in FIGS. 7, 8, and 9. In yet another embodiment, the filters are selected to encompass multiple peaks, while in another embodiment, the passband characteristics of at least one of the filters overlaps with at least one other filter. The number of wavelengths defines the number of the optical channels N.

Absolute Emission Power and Power Consumption

The power balance in a light source's emission is illustrated in FIG. 10. All of the electrical power $P_{ELEC}$ delivered to an illumination source is converted to power emitted in the electromagnetic spectrum $P_{EM}$ and to power dissipated as heat $P_{HEAT}$. For example, a tungsten wire in an incandescent lamp reaches temperature above 2000 K and emits light in the visible part of the electromagnetic spectrum, while the lamp body heats to temperatures substantially below 1000 K. (For simplicity, we assume that the sections of the lamp that have temperature between these two extrema contribute negligibly to the electromagnetic emission spectrum.) Under this assumption, we divide the emission spectrum from any lamp into the light emitting part $P_{EM}$ [W] with temperature greater than 1000 K and the heat emitting fraction $P_{HEAT}$ [W] for which the body temperature is well below 1000 K and hence is referred to as heat dissipation. Clearly, $P_{ELEC}=P_{EM}+P_{HEAT}$.

A fraction of the $P_{EM}$ [W] power is emitted into the visible part of the spectrum, and we can refer to this fraction as the radiance [W] in the visible part of the spectrum or, more efficiently, we quantify the visible part of the spectrum as luminous flux [lm]. Luminous efficacy $K_r$ of an illumination source is measured in lumens per watt [lm/W] and it is the ratio of luminous flux L [lm] per every watt of electromagnetic power $P_{EM}$ generated for the purpose of light generation.

Every illumination source (i.e., lamp) also dissipates heat $P_{HEAT}$ [W] while providing the power delivered to the electromagnetic spectrum $P_{EM}$ [W] for illumination. Since $P_{HEAT}$ is actually heat and by Planck's law any material body at elevated temperature emits radiation, we shall maintain that the heat can also be drawn as an electromagnetic spectrum emitted from the lamp.

These metrics are illustrated in FIG. 10 where $P_{EM}$ is the area under the electromagnetic part of the spectrum that is emitted by the light source, and the area under the second curve at longer wavelengths equals the dissipated power $P_{HEAT}$. The graphs are not to scale.

The two metrics used to quantify these luminous-flux and power conversions for illumination sources are luminous efficacy of the radiation given by $K_r:=L/P_{EM}$ [lm/W] (IEC 845-21-090), while luminous efficiency of a lamp η is the ratio $P_{EM}/P_{ELEC}$. As an example, a halogen incandescent lamp has luminous efficacy of the radiation $K_r \approx 5.5$ lm/W, while its luminous efficiency is less than 1%. An LED lamp can have $K_r \approx 130$ lm/W and $\eta \approx 13\%$.

A goal of the LPC system is relate the measured quantity to at least one of the following illumination sources quantities: (a) the luminous flux coming from the Earth, (b) overall radiance coming from the Earth and (c) electrical power used to deliver the measured luminous flux. This would enable the production of a global map of the estimated quantity.

Suppose we have an illumination source m that emits $P_{EM}(m,t)$ into space and we capture N different spectral segments of its spectrum each centered at $\lambda_n$ with bandwidth $\Delta\lambda_n$. Each of the filters $F_n$ has its own insertion loss, each lens $L_n$ its own scattering losses and inefficiency, each detector $D_n$ behind its own responsivity, all of which are different for a different center wavelength n, and finally the transimpedance of the amplifiers $A_n$. We shall merge the insertion loss, filter shape, lens losses, detector responsivities and amplifier gains into one effective responsivity $R_n$ that converts the incident power [W] into a dimensionless signal at the output of the amplifier. We use dimensionless quantity because once the hardware is built, it can always be related to a voltage or a current. Each of the elements $Y_n(t)$ of the measured vector Y is related to the power spectral density via:

$$Y_n(t) = \beta \int_0^\infty R_n(\lambda) \cdot P'_{EM}(\lambda, t) d\lambda \qquad (2)$$

where $R_n(\lambda)$ [1/W] is the effective responsivity on channel n versus wavelength $\lambda$ [nm] and $P'_{EM}(\lambda,t)$ [W/nm] is the power spectral density of the electromagnetic radiation produced by the illumination source versus wavelength. The factor $\beta$ (beta) depends on how far away from the source we make the measurement of the emitted light. It will be high in the laboratory, but very small when the light from the Earth is measured on a satellite. Note that $Y_n(t)$ is a radiometric quantity and is not directly relatable to the luminous flux because it includes emission at the wavelengths that are outside of the visible range.

With the simultaneous measurement of the light incident on all n channels, we obtain a vector Y(t). Every illumination source hence has a unique vector Y(t) that captures the shape of the spectral emission $P'_{EM}(\lambda,t)$ incident on the sensor. We now estimate the flicker spectrum on each of the components of the vector $Y_n(t)$ and obtain Fourier components for each of n components. For each of the N channels of flicker spectra and for the K-component measurement vector, we select a certain number of desired components. The measurement vector now contains N elements that correspond to the DC values of detector signal, while we can select any number of the harmonic amplitudes of the signal from each channel N to further describe the captured signal. If for each channel we use the DC value and H harmonics, the total number of data points taken per illumination source will be $K=N\cdot(1+H)$. The intensity of measured light is proportional to the sum of N DC components of the vector Y because the AC components do not contribute to the overall power of the light captured. We refer to this intensity measure as the N-element norm of the vector Y.

The intensity of the light captured is proportional to the N-element norm of measurement vector Y, while the relative values of the components of the normalized vector y are used to determine the composition, namely, break the measured light into known illumination source components using the unmixing algorithm disclosed in this application. The N-element norm of measurement vector Y can then be related to the power dissipation on the surface of the Earth needed to achieve the measured intensity. The N-element norm and the normalized vectors are given as:

$$|Y|_{(N)} = \sum_{n=1}^{N} Y_n \quad y_k = \frac{Y_k}{\sum_{n=1}^{N} Y_n} \qquad (3)$$

Note that N is the number of channels, but that k is the number of elements in the measurement vector Y and that the number of elements K in this vector is larger than the number of channels by the number of harmonics of interest in the captured light, hence $1 \leq k \leq K$ and that K>N. Normalized measurement vector y has components denoted with $y_k$.

Note furthermore, that the DC values (elements of vector Y) are non-negative by definition, but that the Fourier amplitudes of the flicker spectra will generally be complex numbers and the argument of the first harmonic will depend on the timing when the spectrum was acquired relative to the phase of the power grid at the surface of the Earth. For each light-source all of the complex harmonic amplitudes should be rotated by the phase of the first harmonic amplitude to ensure that the first harmonic amplitude is a real positive number, while the amplitudes of harmonics with harmonic numbers greater than unity should be converted from complex numbers to real numbers with values equal to the absolute value of the phase-corrected harmonic amplitude.

Variables
- N=number of channels (number of parallel filters, lenses and detectors).
- M=number of illumination sources considered and characterized to make the reference matrix; number of columns in the reference matrix.
- H=number of frequencies in the measured flicker spectrum where harmonic amplitude values are taken (H does not include the DC value).
- K=number of elements in the measurement vector Y: K=N(1+H), where 1 stands for the DC value; number of rows in the reference matrix Unmixing Method Description The measurement of light emitted from the Earth results in a normalized vector y. The assumption is that this vector y is a linear superposition of known (reference) illumination sources $y_m$ (m=0, 1, 2, . . . M). This is generally referred to as linear mixing.

$$y = \sum_{m=1}^{M} s_m x_m \qquad (4)$$

where the elements of the m-row vector $x=[x_1 \; x_2 \; \ldots \; x_M]^T$ are target abundances (the superscript T means transposed). The reference matrix S contains m columns, one column for each illumination source measured during the calibration. The reference matrix is shown below:

$$s_m = \begin{bmatrix} s_{1,m} \\ s_{2,m} \\ \vdots \\ s_{K,m} \end{bmatrix} \rightarrow s = \begin{bmatrix} s_{1,1} & s_{1,2} & \cdots & s_{1,M} \\ \vdots & \vdots & \ddots & \vdots \\ s_{N,1} & s_{N,2} & \cdots & s_{N,M} \\ s_{N+1,1} & s_{N+1,2} & \cdots & s_{N+1,M} \\ \vdots & \vdots & \ddots & \vdots \\ s_{K,1} & s_{K,2} & \cdots & s_{K,M} \end{bmatrix} \begin{array}{l} \}\text{DC components} \\ \\ \}\text{AC components} \end{array} \quad (5)$$

The method is a spectral unmixing algorithm to be used on the processing module 403, which relies on a reference matrix data bank (within memory module 404). The data are vectors of numbers, each of a length K, stored for each individual light source to which the device has been calibrated. As such, the reference data bank contains K×M data points, where M is the number of light sources (number of targets).

The matrix S is formed with M column vectors $s_m$, where each column vector contains K elements (rows), each of the K elements is an output from the N channels measured on illumination source m of the M different illumination sources and H selected higher flicker frequency components of the temporal response, hence K=N(1+H). The components (rows) of the column vector $s_m$ are denoted $s_{k,m}$, where 1≤k≤K. The elements of these vectors are non-negative and the N-element norm of the vector components of $s_m$ is equal to unity:

$$\forall m \sum_{n=1}^{N} s_{n,m} = 1. \quad (5)$$

Note that the $s_{n,m}$ are positive real numbers as was described above. The reference measurements are done for each m of the M illumination sources and a matrix S with K rows and M columns is formed. The reference illumination sources are also referred to as "targets" (to be consistent with the hyperspectral sub-pixel imaging terminology).

The assumption is that the mixtures of light coming from the many sources are linear superpositions in the sense that the power from each of the available sources is weighted by some target abundance coefficient and that the individual contributions are added. For each measurement, the target abundance is given by the elements in an M-row vector $x=[x_1 \, x_2 \ldots x_M]^T$. The total intensity of the measurement is denoted $|Y|_N$, while the target abundances $x_m$ sum to unity (all have a taxicab norm equal to 1):

$$\sum_{m=1}^{M} x_m = 1. \quad (6)$$

Any measurement of an illumination mixture is expressed in terms of the total intensity P and the normalized distribution of channels given by the vector y. This is expressed ideally with the expression y=S·x:

$$\begin{bmatrix} y_1 \\ y_2 \\ \vdots \\ y_k \end{bmatrix} = \begin{bmatrix} s_{1,1} & s_{1,2} & \cdots & s_{1,M} \\ s_{2,1} & s_{2,2} & \cdots & s_{2,M} \\ \vdots & \vdots & \ddots & \vdots \\ s_{K,1} & s_{K,2} & \cdots & s_{K,M} \end{bmatrix} \cdot \begin{bmatrix} x_1 \\ x_2 \\ \vdots \\ x_M \end{bmatrix} \quad (7)$$

With the normalizations, the measured vector y must have its N-element norm equal to unity:

$$y_k = \sum_{m=1}^{M} s_{k,m} x_m \rightarrow \sum_{k=1}^{N} y_k = \sum_{m=1}^{M} x_m \left( \sum_{n=1}^{N} s_{n,m} \right) = 1 \rightarrow \sum_{n=1}^{N} s_{n,m} = 1 \quad (8)$$

Therefore, a system with K channels produces a (K×1) vector y, $$y = Sx \quad (9)$$

Since y (K×1) and S (K×M) are measured quantities, we are seeking an estimate of the unknown vector of target abundances x (M×1). Vector z is the best fit for x in the least square sense |y−Sx|>|y−Sz|, where | . . . | is the Euclidian norm of the vector between the | signs. The optimal target abundance vector z is $S^+y$, where $S^+$ (M×K) is the Moore-Penrose inverse of matrix S. The error in the method is |$S^+y-x$|. This approach to linear square optimization is well-known in the art and can be found in publicly available literature[4].

[4] Such as, for example, J. M. Ortega, Matrix Theory published by Plenum Press in New York (1987)

The above-described approach is a least squares unconstrained method, but other constrained approaches can be found in publicly available literature and are shortly summarized below. All of the approaches are publicly available. Adding constraints to the unmixing approach is a natural addition since the target abundance quantities as well as reference spectra used in the unmixing are normalized and constrained. Namely, the target abundances $x_m$ sum to unity (all have a taxicab norm equal to 1), see Equation (6). Therefore, the optimal target abundance vector z coordinates also sum to unity and this vector can be found from the unconstrained optimization problem by seeking the vector of target abundances subject to the linear restriction: $a^T x = 1$, where a is a unity column vector (M×1) where each coordinate is equal to one.

The second constraint is that the coordinates in the target abundance vector x must be non-negative numbers. Adding this constraint complicates finding the abundance vector since no closed-form solution has been found and an iterative algorithm must be employed to find the optimal target abundance vector z that is the best fit for x in the least square sense subject to the constraint that each coordinate of z is a non-negative number. Note that both the non-negativity constraint and the sum to one constraint can be included. The constrained method is a special case of a more general convex optimization problem.

Interior-point methods are a certain class of iterative algorithms commonly employed to solve general convex optimization problems. It is known that the iterative approach converges towards the optimal solution as the methods satisfy Karush-Kuhn-Tucker (KKT) conditions, which are necessary derivative tests for the optimal solution.

The most important advantage of using flicker harmonics in the inversion disclosed above is that it provides more information on each illumination source than was available from just DC data. This is evident from the following consideration: in the case when only DC light intensity is being captured by N filters, the reference matrix size is (N×M) and there are three options:

When N<M, the problem is underdefined and the estimate computation using the pseudoinverse will produce a large error largely independent of the choice of filters. We shall not use this case.

When N=M, the problem is well defined provided that the determinant of the reference matrix is not zero. This is generally true because it is unlikely that captured the spectra are scaled versions of any other spectrum in the reference matrix. If there is no noise added to the measured data, zero error is achieved.

When N>M, the system is over-defined and zero error is achieved if there is no noise.

The relative size of N and M is bound by two opposing conditions. In order to achieve high unmixing accuracy, we need that N≥M. On the other hand, we need M to be as large as possible to capture largest possible number of illumination sources. Unfortunately, the number of filters N is limited by the size and weight of the module that needs to fit onto a nanosatellite. The ideal approach to resolving this problem is to effectively increase N without increasing the number of channels. This is precisely what adding the harmonic information does: the condition for high accuracy of the unmixing algorithm is in fact ensuring that K≥M. Consequently, adding H harmonics, effectively increases the number of channels and thereby provides higher accuracy relatively to DC only approaches. For example, if only the first flicker harmonic is captured in addition to the DC value on each of the N channels, the measurement vector is doubled and hence the number of reference sources in the reference matrix can be doubled. In this way, the reference matrix has double the number of rows and columns. This is a preferable approach in the case where the number of filters is limited, which is the case with the disclosed LPCM. As an example, using just one harmonic (H=1) will effectively double the number of channels, which is a great advantage for a module with a limited number of channels.

Calibration

The first step in practicing the invention is to create a reference matrix with reference illumination source data. This may be in the form of a matrix that has K rows and M columns and is populated with numbers that have been obtained by characterizing M different illumination sources using an N-channel LPC system that captures L harmonics of the incident light in each channel. The laboratory experimental environment is illustrated in FIG. 11(a) where the light-pollution characterization module (LPCM), which is a part of the LPC system is located in a laboratory and some distance $\ell_1$ from the illumination source also positioned in the laboratory and a measurement is being made of the filtered light in N-channels and flicker spectra of each channel analyzed to provide N DC values plus N·H harmonics of the emitted light. In addition, the emitted light may also be measured using a color-meter to provide calibrated photometric characterization and the electrical power dissipation noted.

Now, in FIG. 11(b) we analyze the situation when the LPCM is in orbit at a distance $\ell_2$ facing towards the Earth (nadir pointing) and the same light source is position at the surface of the Earth. Then, for any position of the satellite, we need an of the free-space loss β. This can be done analytically by assuming that the light dispersion obeys ray optics and that we know the approximate emission pattern, for example, whether the emitter can be treated as a Lambertian emitter. In one embodiment, the filter selection is done in such a way that the filter passbands avoid wavelengths in which the atmosphere has highest absorption.

Filter Selection

The accuracy of the unmixing algorithm further depends on the filter selection, namely, how are the central wavelengths and full-width half-maxima selected. This is preferably done in the following manner: for each source m, we manually select a set $\Lambda_m$ of wavelengths that are characteristic for that light sources $\Lambda_m = \{\lambda_1, \lambda_2, \ldots \lambda \ell_m\}$ along with filter bandpass widths $\Delta_m = \{\Delta\lambda_1, \Delta\lambda_2, \ldots \Delta\lambda \ell_m\}$. For each source m, hence, there is a number of filters associated with the source. We add filters at wavelengths where no source appears and obtain a complete set of possible filters with the total number of filters denoted with F. Each filter in this union has a defined center wavelength and full-width half-maximum (FWHM). FIG. 12 shows an exemplary list of 20 filters (F=20) from which one can select N filters. FIG. 13 shows the optical emission spectra of 7 different illumination sources (M=7) with the locations of the filter center wavelengths.

Now select N filters from the defined F (the are $_NC_F$ combination for this selection – $_NC_F$ is a binomial coefficient "n choose k") for each combination perform a simple Monte Carlo method in selecting a random target abundance vector and computing the error |S$^+$y−x| between the estimated S$^+$y and the initial target abundance x vectors. The algorithm then finds the filter combination that gives the lowest error |S$^+$y−x|.

The far-right column of the table shown in FIG. 12 shows which combination of N=7 filters provides the lowest error when applies to the M=7 illumination sources shown in FIG. 12.

Method of Practicing the Invention

FIG. 14 illustrates the flow chart of the method of identifying illumination source in captured light. This method uses both the average and characteristic of the periodic fluctuation in the illumination to perform the unmixing. The steps 351 to 357 are referred to as calibration steps, while the steps 358 to 363 are referred to as normal operation steps. As indicated with the step 362, normal operation steps may be repeated any number of times, but require the calibration steps to be executed at least once for M>1 illumination sources.

In calibration step 351, M different illumination sources are provided. The set of provided illumination sources contains representative categories of illumination sources that are expected to be detected in the normal operation mode. At the output from step 351, the illumination source counter m is set to the first illumination source: m=1.

In step 352, illumination source m is powered on, and the electrical power delivered to the illumination source $P_m$ is noted.

In step 353, the temporal variation of N optical spectrum segments is captured and converted into N electrical signals.

In step 354, the N electrical signals are converted to digital form. Both the DC average and flicker spectrum of the captured data is estimated. The flicker spectrum is sampled at H predetermined frequencies plus the amplitude value at zero frequency to obtain N·(1+H) amplitudes to be used in the data analysis.

In step 355, the N·(1+H) digital data points of illumination source m are stored in the reference data bank.

In step 356, the method decides whether all of the M illumination sources have been characterized. If the answer is no, then the illumination source counter m is incremented in step 357, and the calibration method is continued by starting from the step 352, with now incremented illumination source counter m. If the calibration has completed with m=M, then the LPC system can be used in normal operation mode.

In step 358, the LPC system is in an operating environment, which may be on a satellite measuring light-pollution from an orbit, an airplane, a vehicle or may be stationary. The LPC is exposed to light that is to be analyzed.

In step 359, the LPC captures temporal fluctuations of the optical emission captured in at least in one of N spectral segments and converts this into electrical signal.

In step 360, the electrical signal is converted into digital form. Each of the DC average and flicker spectrum of the captured data is estimated. The flicker spectrum is sampled at H predetermined frequencies plus one amplitude at zero frequency to obtain 1+H amplitudes to be used in the data analysis.

In step 361, the N·(1+H) digital measurement data and the measurement number or location where the measurement was done is saved in digital form in LPC memory.

In step 362, the LPCM is ready to make another measurement and if this is required (YES), the method will start over from step 358 at a different location or measurement ordinal number. If LPC memory is full or there is an opportunity to download the memory contents (NO), the data is downloaded to a remote processor or the same processor in the LPC for further processing.

In step 363, the downloaded data is processed for every location or measurement in that the unmixing algorithm is executed and target abundance coefficients $x_m$ for $1 \leq m \leq M$ are determined and, optionally, electrical power $P_m$ consumed by each of the sources is used to compute electrical power dissipation per illumination source in the mixture. The method uses both DC and AC characteristics of conventional illumination sources to improve the accuracy of unmixing.

There are variations on the presented method and the LPC system that can be implemented to optimize the unmixing without departing from the invention. Some of these variations are discussed below.

Any number of harmonics of 100 Hz and 120 Hz may be selected for sampling during measurement stage in step 354 and 360, and the set of flicker-spectrum samples does not have to be a harmonic, but rather suitable selected frequency which is off interest. Natural light sources, such as, fire, volcanic eruption or *Aurora Borealis* will fluctuate and will not have peaks in the flicker spectrum, but may be detected by selecting an appropriate set of frequencies that capture the power spectral density of the light intensity fluctuation and from which the form of the power spectral density can be inferred.

The filter passbands generally do not overlap, but it is also possible that for the purpose of improving signal to noise ratio, some of the filters have overlapping bands.

For the purposes of this application, flicker frequency spectrum refers to oscillations or fluctuations in the light intensity with frequency components between 0 Hz and at least 20 kHz.

It should be understood that there are many variations of the disclosed methods and systems described in the embodiments above without limiting the present invention, and that the scope of the present invention is to be determined by the following claims.

The invention claimed is:

1. A light detection module receptive to incident light; the light detection module comprising:
    N optical channels, wherein each optical channel comprises an optical filter, a detector, and an amplifier, and each optical channel having an output port;
    an N×1 switch having N input ports and a single output port, wherein each input port is connected to a corresponding one and only one output port of each of said N optical channels to receive a corresponding amplified detector output corresponding to a filtered optical intensity incident on the detector, and wherein the switch is operatively configured to sequentially cycle between channels, to connect each of the amplified detector outputs in turn to the output port of the switch;
    an analog-to-digital converter (ADC) connected to the output port of the N×1 switch, and operatively configured to sample a time dependent optical intensity signal input to the ADC from the switch, and generate a corresponding time dependent digital signal output from the ADC; and
    a microcontroller, connected to the N×1 switch and the ADC, and operatively configured to:
        control an acquisition sequence by setting a sampling rate and a sample duration used by the ADC to provide a digital voltage data stream from each channel in turn; and
        make at least an average optical intensity value characterizing the voltage data stream available from each optical channel in turn at a digital output port of the microcontroller;
    such that the module provides an output at the digital output port of the microcontroller comprising N data values, characterizing the light incident on the N optical channels of the module;
    wherein the microcontroller is further operatively configured, when cycling through the channel output ports in turn, to, for each channel:
        compute an estimated flicker spectrum from the digital voltage data stream provided by the ADC for that channel;
        sample the estimated flicker spectrum for that channel at DC and at H select flicker sampling frequencies where H is an integer greater than 0; and
        make said H values of the estimated flicker spectrum, available at the digital output port of the microcontroller for each channel;
    such that the output provided by the module at the digital output port of the microcontroller comprises N*(1+H) data values, characterizing the light incident on the module.

2. The light detection module of claim 1, wherein computing the estimated flicker spectrum comprises executing a Fast Fourier Transform algorithm.

3. The light detection module of claim 1, wherein H=1, and the values of the estimated flicker spectrum provided for each channel are a value of the average light intensity and a value of amplitude at a predetermined flicker frequency.

4. The light detection module of claim 3, wherein the predetermined frequency is one of 100 Hz and 120 Hz.

5. The light detection module of claim 2,
    wherein the digital output of the microcontroller is connected to a microprocessor module with access to reference data on a plurality of artificial light sources;
    wherein the microprocessor is operatively configured to execute an unmixing algorithm to produce relative abundance information characterizing the mixture of artificial light sources; and
    wherein the reference data comprises N*(1+H) reference flicker spectrum intensity values previously measured, by detectors identical to, or calibrated with respect to, the N channel detectors, through filters identical to, or calibrated with respect to, the N channel filters, from received emission from the plurality of artificial light sources, and sampled at flicker spectrum frequency values identical to the H frequencies sampled in the incident light by the light detection module.

* * * * *